US012434148B2

(12) United States Patent
Shibata et al.

(10) Patent No.: US 12,434,148 B2
(45) Date of Patent: Oct. 7, 2025

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Nozomu Shibata, Tokyo (JP); Ryohei Ishizuka, Tokyo (JP); Michiaki Sakaguchi, Tokyo (JP); Hiroki Tsuda, Tokyo (JP); Koji Nara, Tokyo (JP)

(73) Assignee: CYGAMES, INC., Tokyo (JP)

( * ) Notice: Subject to any disclaimer, the term of this patent is extended or adjusted under 35 U.S.C. 154(b) by 317 days.

(21) Appl. No.: 18/049,908

(22) Filed: Oct. 26, 2022

(65) Prior Publication Data

US 2023/0069411 A1 Mar. 2, 2023

Related U.S. Application Data

(63) Continuation of application No. PCT/JP2021/017075, filed on Apr. 28, 2021.

(30) Foreign Application Priority Data

Apr. 30, 2020 (JP) ................................ 2020-080577

(51) Int. Cl.
*A63F 13/58* (2014.01)
*A63F 13/352* (2014.01)
*A63F 13/69* (2014.01)

(52) U.S. Cl.
CPC ............ *A63F 13/58* (2014.09); *A63F 13/352* (2014.09); *A63F 13/69* (2014.09)

(58) Field of Classification Search
CPC .......... A63F 13/45; A63F 13/55; A63F 13/58; A63F 13/67; A63F 13/69; A63F 13/79;
(Continued)

(56) References Cited

U.S. PATENT DOCUMENTS

2007/0129126 A1* 6/2007 Van Luchene ......... G06Q 30/04 463/1
2007/0149266 A1* 6/2007 Arakawa ............... A63F 13/537 463/8
(Continued)

FOREIGN PATENT DOCUMENTS

JP 6662731 B2 3/2020

OTHER PUBLICATIONS

"Guides & Resources for New Players" by DeadByDaylight_Mod. Reddit.com. [dated Sep. 17, 2019], [online], [retrieved on Jan. 24, 2025]. <URL: https://www.reddit.com/r/deadbydaylight/comments/d5elu7/guides_resources_for_new_players/>. 8 Pages. (Year: 2019).*
(Continued)

*Primary Examiner* — Milap Shah
(74) *Attorney, Agent, or Firm* — OSHA BERGMAN WATANABE & BURTON LLP

(57) ABSTRACT

A non-transitory computer readable medium stores a program causing a computer to execute: storing, in a storage unit, a character for which an acquisition condition is satisfied as a possessed character among a plurality of characters including a first character and a second character, each of the plurality of characters including the acquisition condition for acquiring the character, a special ability available in a prescribed game, and a release condition for releasing the special ability; releasing the special ability of the first character when the release condition of the first character is satisfied; releasing the special ability of the second character when the release condition of the second character is satisfied, the acquisition condition of the second character being different from the acquisition condition of the first character, and the release condition of the second character being different from the release condition of the first character; and setting, when the special ability of at least one of the first character and the second character is
(Continued)

released, the released special ability so as to be available to other characters in the prescribed game.

10 Claims, 30 Drawing Sheets

(58) Field of Classification Search
CPC ...... A63F 13/795; A63F 13/822; A63F 13/85; A63F 2300/305; A63F 2300/537; A63F 2300/5566; A63F 2300/575; A63F 2300/807
See application file for complete search history.

(56) References Cited

U.S. PATENT DOCUMENTS

| | | | | |
|---|---|---|---|---|
| 2008/0004093 | A1* | 1/2008 | Van Luchene | G07F 17/32 463/1 |
| 2013/0252682 | A1* | 9/2013 | Umekawa | A63F 13/58 463/1 |
| 2014/0295973 | A1* | 10/2014 | Inagawa | A63F 13/69 463/42 |
| 2015/0336003 | A1* | 11/2015 | Tezuka | A63F 13/58 463/17 |
| 2018/0008895 | A1 | 1/2018 | Mifune | |

OTHER PUBLICATIONS

“Dead by Daylight: A Jumpchain CYOA” by Myrmidont. [online], [retrieved on Jan. 24, 2025]. <URL: https://i.4pcdn.org/tg/1513327696370.pdf>. 2019. 19 Pages. (Year: 2019).*
Curly, Bill. “All You Need to Know in DBD in 3 Minutes”. [dated Sep. 30, 2019], [online], [retrieved on Jan. 24, 2025]. <URL: https://steamcommunity.com/sharedfiles/filedetails/?id=1858137731>. 8 Pages. (Year: 2019).*
Fibijean. “How Not to be Dead by Daylight”. [online], [retrieved on Jan. 24, 2025]. <URL: https://us.v-cdn.net/6030815/uploads/071/2BROBXQ354R0.pdf>. 2019. 29 Pages. (Year: 2019).*
“A Beginners Guide to Dead by Daylight”. [online], [retrieved on Jan. 24, 2025]. <URL: https://venamin24.wixsite.com/aguide2dbd>. 2020. 14 Pages. (Year: 2020).*
“Dead by Daylight”. Wikipedia.org [dated Apr. 25, 2020], [online], [retrieved on Jan. 24, 2025]. <URL: https://web.archive.org/web/20200425215127/https://en.wikipedia.org/wiki/Dead_by_Daylight#expand>. 11 Pages. (Year: 2020).*
[Another Eden] Jade’s evaluation and status [Anaden], [online]AppMedia, Sep. 20, 2017,<URL:https://appmedia.ip/another-eden/831985> (7 pages).
[Another Eden]Efficient acquisition of memory books necessary for class change(evlolution/awakening)[Anaden], [online] Another Eden strategy wiki summary [Anaden], May 29, 2017, (7 pages).
“Jojo SS” Growing your favorite unit to the limit by “breaking through the limit” and “awakening of the soul”!, [online] Famitsu App. Apr. 25, 2014, <URL:https://app.famitsu.com/20140425_360980/> (19 pages).
International Search Report issued in International Application No. PCT/JP2021/017075, mailed Jul. 6, 2021 (6 pages).
Written Opinion issued in International Application No. PCT/JP2021/017075; Dated Jul. 6, 2021 (4 pages).
Office Action issued in Japanese Application No. 2020-080577; Dated Oct. 6, 2020 (4 pages).
Honor of Kings, Nov. 26, 2015, https://baike.baidu.com/item/%E7%8E%8B%E8%80%85%E8%8D%A3%E8%80%80/18752941; With partial English Translation (5 pages).
DOTA2, Apr. 28, 2013, https://baike.baidu.com/item/%E5%88%80%E5%A1%942/18511 480; With partial English Translation (4 pages).
Office Action issued in Chinese Application No. 202180031647.9; Dated Jun. 26, 2025 (12 pages).

* cited by examiner

| SKILL ID | RELEASE PERMISSION CONDITION INFORMATION | RELEASE CONDITION INFORMATION | COST INFORMATION |
|---|---|---|---|
| 0001 | LEVEL IS GREATER THAN OR EQUAL TO 80 PARAMETER RAISING LEVEL IS GREATER THAN OR EQUAL TO 50 | ItemA × 1<br>ItemB × 1 | COST 5 |
| 0004 | LEVEL IS GREATER THAN OR EQUAL TO 80 PARAMETER RAISING LEVEL IS GREATER THAN OR EQUAL TO 50 | ItemA × 2<br>ItemC × 1 | COST 6 |
| 0005 | STORY PROGRESS LEVEL IS GREATER THAN OR EQUAL TO 00211 | — | COST 3 |
| 0006 | STORY PROGRESS LEVEL IS GREATER THAN OR EQUAL TO 00211 | — | COST 4 |
| 0007 | STORY PROGRESS LEVEL IS GREATER THAN OR EQUAL TO 00211 | — | COST 3 |
| 0008 | STORY PROGRESS LEVEL IS GREATER THAN OR EQUAL TO 00211 | — | COST 4 |
| 0009 | STORY PROGRESS LEVEL IS GREATER THAN OR EQUAL TO 00211 | — | COST 3 |
| 0010 | STORY PROGRESS LEVEL IS GREATER THAN OR EQUAL TO 00211 | — | COST 4 |

FIG.10

| CHARACTER ID | SKILL ID | | | | | | COST UPPER LIMIT INFORMATION |
|---|---|---|---|---|---|---|---|
| | SKILL 1 | RELEASE PERMISSION FLAG 1 | RELEASE FLAG 1 | SKILL 2 | RELEASE PERMISSION FLAG 2 | RELEASE FLAG 2 | |
| 0001 | 0001 | ON | ON | 0002 | OFF | OFF | COST 10 |
| 0002 | 0003 | OFF | OFF | 0004 | ON | ON | COST 10 |
| 0003 | 0005 | ON | ON | 0006 | ON | ON | COST 10 |
| 0004 | 0007 | ON | ON | 0008 | ON | ON | COST 10 |
| 0005 | 0009 | ON | ON | 0010 | ON | ON | COST 10 |

FIG.11

| PARTY ID | FORMATION NO. | CHARACTER ID | SKILL ID | | | |
|---|---|---|---|---|---|---|
| | | | SKILL 1 | SKILL 2 | SKILL 3 | SKILL 4 |
| 0001 | 0001(leader) | 0001 | 0001 | 0002 | 0005 | 0007 |
| | 0002 | 0003 | 0005 | 0006 | 0007 | 0009 |
| | 0003 | 0004 | 0007 | 0008 | 0005 | 0009 |
| | 0004 | 0005 | 0009 | 0010 | 0005 | 0007 |

FIG.12

FIG.21
C
BOSS CHARACTER PERFORMING ACTION?
P10-21
YES
NO
DETERMINE ACTION OF BOSS CHARACTER
P10-22
ATTACK-RELATED ACTION?
P10-23
NO
YES
HIT CHECK PROCESSING
P10-25
PARAMETER UPDATE PROCESSING
S10-24
COMPUTE DAMAGE
P10-26
UPDATE HP OF DAMAGED CHARACTER
P10-27
HP OF DAMAGED CHARACTER ≤ 0?
P10-28
NO
YES
ANY SURVIVING CHARACTER?
P10-29
YES
NO
OPERABLE CHARACTER?
P10-30
NO
YES
CHANGE OPERABLE CHARACTER
P10-31
QUEST END PROCESSING
P10-32
D
FRAME UPDATE PROCESSING
P10-33
RETURN

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/017075, filed on Apr. 28, 2021, which claims priority to Japanese Patent Application No. 2020-080577, filed on Apr. 30, 2020, the entire contents of which are incorporated by reference herein.

BACKGROUND ART

Technical Field

The present invention relates to information processing programs, information processing methods, and information processing systems.

Patent Literature 1 discloses the feature wherein it is possible to set, for characters, various abilities that become available when prescribed conditions are satisfied.

CITATION LIST

Patent Literature

Patent Literature 1: JP 6662731 B

SUMMARY OF INVENTION

Technical Problem

However, in order to enhance game intricacy, there is room for improvement with prescribed conditions concerning abilities that can be set for characters.

It is an object of the present invention to provide an information processing program, an information processing method, and an information processing system that make it possible to enhance game intricacy.

Solution to Problem

In order to solve the problem described above, an information processing program causes a computer to function as: a storage unit that stores, among a plurality of characters having set therefor a possession condition for possession by a player and a special ability that can be invoked in a prescribed game, characters for which the possession condition is satisfied as possessed characters; a release unit that stores, on the basis of the satisfaction of a first release condition, release completion information of the special ability of a first character having set therefor a first possession condition as the possession condition, and that stores, on the basis of the satisfaction of a second release condition, which is different from the first release condition, release completion information of the special ability of a second character having set therefor a second possession condition, which is different from the first possession condition; and a setting unit that sets at least the special abilities of the first character and the second character for which the release completion information has been stored so that the special abilities can be invoked by other characters in the prescribed game.

The first possession condition may include the consumption of an in-game currency; and the second possession condition need not include the consumption of the in-game currency.

The number of requirements included in the second release condition may be fewer than the number of requirements included in the first release condition.

The ability performance of a released ability released by the release unit may have performance corresponding to the ability performance of a special ability serving as a release source.

In order to solve the problem described above, an information processing method is an information processing method that is executed by either a game terminal or a server or both the game terminal and the server, the server being capable of carrying out communication with the game terminal, the information processing method including: a step of storing, among a plurality of characters having set therefor a possession condition for possession by a player and a special ability that can be invoked in a prescribed game, characters for which the possession condition is satisfied as possessed characters; a step of storing, on the basis of the satisfaction of a first release condition, release completion information of the special ability of a first character having set therefor a first possession condition as the possession condition, and storing, on the basis of the satisfaction of a second release condition, which is different from the first release condition, release completion information of the special ability of a second character having set therefor a second possession condition, which is different from the first possession condition; and a step of setting at least the special abilities of the first character and the second character for which the release completion information has been stored so that the special abilities can be invoked by other characters in the prescribed game.

In order to solve the problem described above, an information processing system is an information processing system including a game terminal and a server that is capable of carrying out communication with the game terminal, wherein either the game terminal or the server or both the game terminal and the server include: a storage unit that stores, among a plurality of characters having set therefor a possession condition for possession by a player and a special ability that can be invoked in a prescribed game, characters for which the possession condition is satisfied as possessed characters; a release unit that stores, on the basis of the satisfaction of a first release condition, release completion information of the special ability of a first character having set therefor a first possession condition as the possession condition, and that stores, on the basis of the satisfaction of a second release condition, which is different from the first release condition, release completion information of the special ability of a second character having set therefor a second possession condition, which is different from the first possession condition; and a setting unit that sets at least the special abilities of the first character and the second character for which the release completion information has been stored so that the special abilities can be invoked by other characters in the prescribed game.

Effects of Disclosure

The present invention makes it possible to enhance game intricacy.

BRIEF DESCRIPTION OF DRAWINGS

FIG. 10 is a figure for explaining example list information.

FIG. 11 is a figure for explaining example owned character information included in player information.

FIG. 12 is a figure for explaining example party information included in player information.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
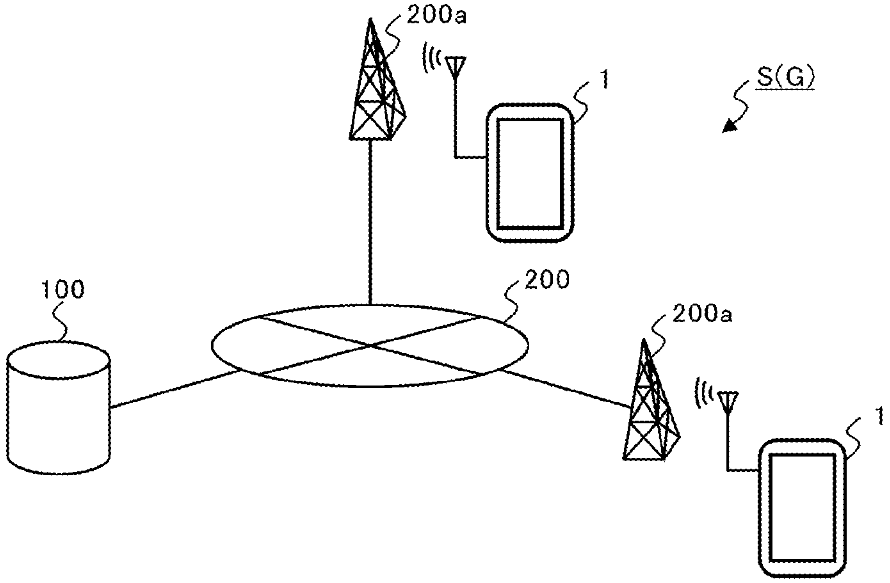
FIG. 1 is an explanatory illustration schematically showing the configuration of an information processing system.

FIG. 1 is an explanatory illustration schematically showing the configuration of an information processing system S. The information processing system S is what is called a client-server system including player terminals 1 (game terminals), a server 100, and a communication network 200 having communication base stations 200*a*.

In the information processing system S in this embodiment, the player terminals 1 and the server 100 function as game devices G. The player terminals 1 and the server 100 individually share roles for controlling the proceeding of a game, and it becomes possible to proceed with the game through cooperation between the player terminals 1 and the server 100.

The player terminals 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 stores information concerning a game that can be played by players (game information). Furthermore, the server 100 accumulates various kinds of information (player information) for each player who plays the game. Furthermore, the server 100 carries out processing, such as updating the accumulated information and allowing the player terminals 1 to download images and various kinds of information, on the basis of operations input from the player terminals 1.

Hereinafter, of the games provided by the information processing system S, battle games will be referred to as in-games, and games other than battle games will be referred to as out-games.

The communication base stations 200*a* are connected to the communication network 200, and send information to and receive information from the player terminals 1 in a wireless manner. The communication network 200 is implemented by a mobile phone network, an Internet network, a local area network (LAN), a special circuit, or the like, and realizes wireless or wired communicative connection between the player terminals 1 and the server 100.

(Hardware Configurations of Player Terminals 1 and Server 100)

Figure 2A:
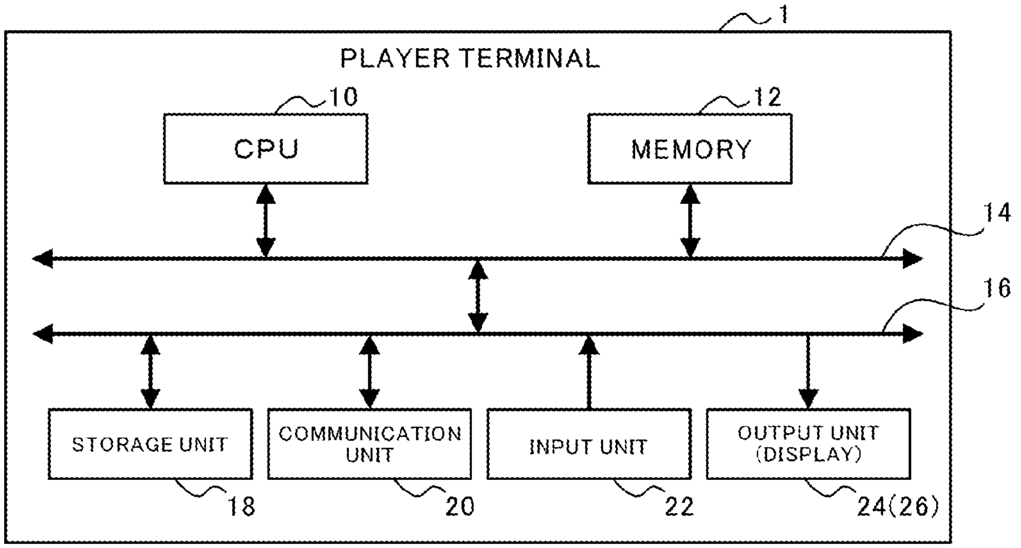
FIG. 2A is an illustration for explaining the hardware configuration of a player terminal.
Figure 2B:
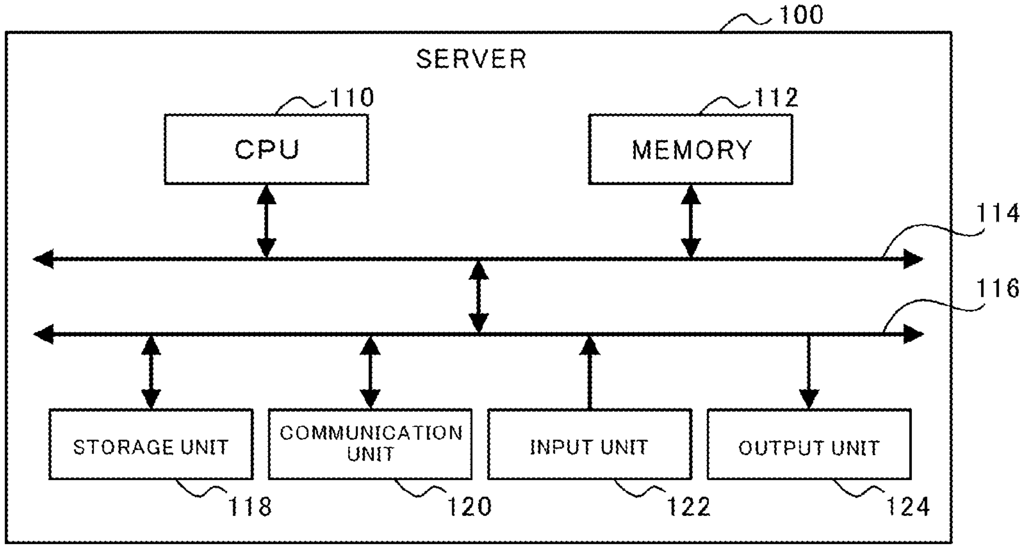
FIG. 2B is an illustration for explaining the hardware configuration of a server.

FIG. 2A is a diagram for explaining the hardware configuration of a player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200*a* in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally) to the player terminal 1. Yet alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the specifics of the games provided by the information processing system S (game devices G) in this embodiment will be described by using an example. In the games in this embodiment, a player can own ally characters acquired by consuming an in-game currency (hereinafter referred to as charged characters), as well as ally characters acquired without consuming the in-game currency (hereinafter referred to as free characters). Charged characters can be acquired, for example, through lotteries, called gacha, by consuming the in-game currency. Furthermore, as well as gacha lotteries, charged characters can also be acquired through exchange with the in-game currency. Meanwhile, free characters can be acquired, for example, through clearing stories or missions in the games. Free characters include ally characters distributed by the administrator of the information processing system S (hereinafter also simply referred to as the administrator), and can be acquired without consuming the in-game currency. Furthermore, free characters include ally characters acquired through lotteries, which are different from charged characters. That is, in this embodiment, the acquisition conditions vary between charged characters and free characters. The player can form a party by selecting a plurality of (four here) characters from the ally characters owned by the player (hereinafter referred to as owned characters), and can play a battle game in which the player plays a battle against enemy characters by using the party formed.

Figure 3A:
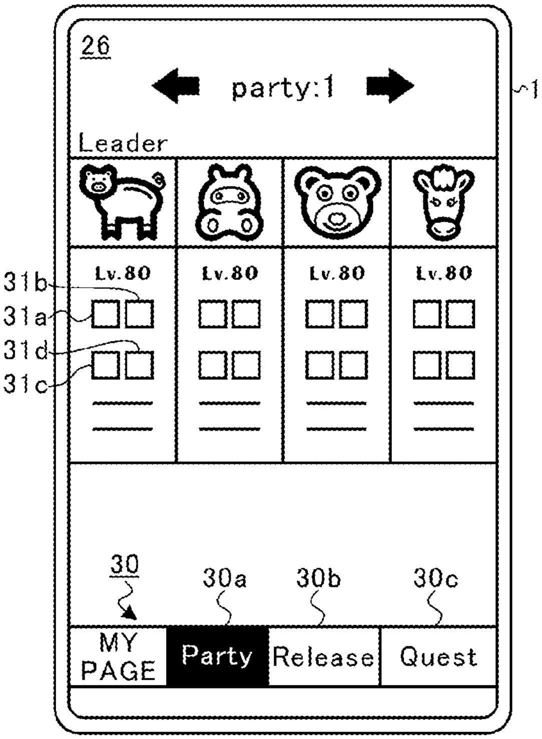
FIGS. 3A and 3B are illustrations for explaining example party formation screens.
Figure 3B:
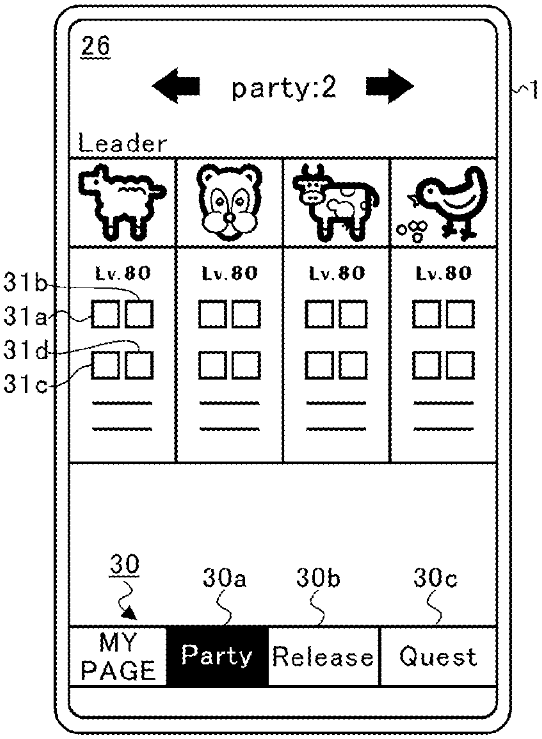

FIGS. 3A and 3B are illustrations for explaining example party formation screens. During an out-game, a menu bar 30 is displayed in a lower part of the display 26. In the menu bar 30, a plurality of selecting parts, including a party-formation selecting part 30*a*, a skill-release selecting part 30*b*, and a quest selecting part 30*c*, are provided. When the party-formation selecting part 30*a* is tapped, a party formation screen is displayed, as shown in FIG. 3A. In the party formation screen, information concerning a party formed by the player (party information) is displayed.

The player registers a party by selecting four owned characters at most. In the party formation screen, information concerning the ally characters constituting the registered party (hereinafter referred to as party forming characters) is displayed as arrayed side by side. Specifically, the player can register four owned characters in a party as a first party forming character, a second party forming character, a third party forming character, and a fourth party forming character. In the party formation screen, information concerning the first party forming character, the second party forming character, the third party forming character, and the fourth party forming character is displayed in this order from the left.

When the region where information concerning one of the party forming characters is tapped to select that party forming character, an owned character list screen, which is not shown, is displayed. The player can replace the party forming character by selecting one of the owned characters in the owned character list screen.

Note that the first party forming character displayed leftmost in the party formation screen is registered as the leader of the party. In the party formation screen, the leader can be changed, for example, by tapping the first party forming character and then tapping another party forming character. That is, the player can change and register the party forming character that serves as the leader in the party formation screen.

Furthermore, the player can register a plurality of parties in advance. Here, it is possible to register nine parties at most. In the party formation screen, when a flick operation in the horizontal direction is input, the party information that is displayed is switched. For example, when a leftward flick operation is input in the state where party information concerning a first party is displayed, as shown in FIG. 3A, party information concerning a second party is displayed, as shown in FIG. 3B.

The party whose party information is displayed in the party formation screen is registered as a party currently selected by the player. Suppose, for example, that another selecting part in the menu bar 30 is tapped in the state where the party information concerning the second party is displayed, as shown in FIG. 3B, whereby the displaying of the party formation screen is terminated. In this case, the second party, whose party information was displayed when the party formation screen was closed, is registered as the currently selected party.

Note that each ally character has set therefor parameters such as hit points (hereinafter referred to as HP) and an attacking ability. The player can raise owned characters, and can enhance various kinds of parameters by advancing the levels of owned characters. In the party information displayed in the party formation screen, the parameters of the individual party forming characters are displayed.

Furthermore, in the party formation screen, an equipment setting frame 31*a* and a dragon setting frame 31*b* are provided in parts of the party information of each party forming character. In the equipment setting frame 31*a*, it is possible to set equipment such as a weapon generated by the player in a game, equipment such as a weapon acquired by the player through a gacha lottery, or equipment such as a weapon distributed from the administrator side. This makes it possible to equip each party forming character with equipment such as a weapon owned by the player. In the dragon setting frame 31*b*, it is possible to set a dragon acquired by the player through a gacha lottery or a dragon distributed from the administrator side. This makes it possible to equip each party forming character with a dragon owned by the player. By providing equipment, etc., the player can advantageously proceed with a battle game; for example, the player can increase parameters, such as the HPs and the attacking abilities, of the party forming characters participating in a battle game (hereinafter referred to as participating characters), or can decrease parameters of enemy characters.

Furthermore, a dragon is a character into which a participating character can transform itself. When a prescribed condition is satisfied during a battle game, only for a limited period, the player can transform a participating character into the dragon that the participating character is equipped with. Since a dragon can give great damage to enemy characters, it becomes possible to advantageously proceed with a battle game by transforming a participating character into a dragon.

Furthermore, each owned character and each item of equipment has skills set therefor in advance. A skill refers to a special ability that becomes available when a prescribed condition is satisfied during a battle game. The player can advantageously proceed with a battle game by using a skill. For example, the player can change various kinds of parameters by using skills, such as giving damage to enemy characters, increasing the attacking abilities of participating characters, recovering the HPs of participating characters, and decreasing the attacking abilities of enemy characters. In the party information displayed in the party formation screen, equipment information concerning the equipment and dragons of the individual party forming characters, as well as information concerning the skills, are displayed.

Each owned character has a plurality of skills set therefor. In this embodiment, each owned character has skill 1 and skill 2 set therefor as special abilities. Skill 1 is set as an initial skill of each owned character, which is available immediately upon the acquisition of that owned character. Skill 2 is a skill that becomes available as a result of raising each owned character, which is not available immediately upon the acquisition of that owned character. Skill 1 and skill 2 set to each owned character are mutually different skills (skill IDs).

Among all the skills owned by all the owned characters, at least one skill has a prescribed release permission condition set therefor by the administrator. Here, as an example, the prescribed release permission condition is satisfied when the level of an owned character and the parameter raising level of the owned character have reached prescribed values. Specifically, skill A owned by owned character A satisfies the release permission condition when the level of owned character A is greater than or equal to 80 and the parameter raising level thereof is greater than or equal to 50. As another example, the prescribed release permission condition is satisfied when the story progress level of the game has reached a specific story progress level. Specifically, skill C and skill D owned by owned character C satisfy the release permission condition when the story progress level of the game has cleared 1-1 in Chapter 2 of the main story.

A skill whose release permission condition is satisfied can be released by satisfying a prescribed release condition set by the administrator. The skill that has been released can be added to another owned character, which is different from the owned character having the skill. Here, for example, the prescribed release condition is satisfied by consuming a prescribed item (hereinafter also referred to as a skill-release special item) that is available in the game. Alternatively, a temporal condition such as the time elapsed since the acquisition of the character or the total play time, gacha (lottery), the input of a serial code, a combination of ally characters, or the like may be adopted as the prescribed release condition.

In this embodiment, the prescribed release condition varies depending on the type of owned character. Specifically, the prescribed release condition varies between charged characters and free characters described earlier. Although this embodiment will be described in the context of an example where the release condition varies between charged characters and free characters, without limitation to this example, the release condition may vary depending on a parameter of the character itself, such as the level of rarity. The release condition for a free character is set so that the level of difficulty thereof is lower than that of the release condition for a charged character.

For example, the number of requirements in the release condition for a free character is less than the number of requirements in the release condition for a charged character. Specifically, the release condition for skill A owned by owned character A, which is a charged character, is satisfied by consuming one item A and one item B. Meanwhile, the release condition for skills C and D owned by owned character C, which are free characters, is the same as the release permission condition described earlier (i.e., clearing 1-1 in Chapter 2 of the main story). Therefore, a skill-release special item is not necessary in order to release the skill of a free character. However, without limitation to this case, the release of a skill of a free character may be satisfied by consuming item A or item B. Alternatively, the release of a skill of a free character may be satisfied by consuming an item that is less difficult to acquire than an item necessary for releasing the skill of a charged character. Yet alternatively, the skill of a free character need not have a release permission condition and a release condition set therefor, and may be released upon the possession thereof by the player.

Figure 4A:
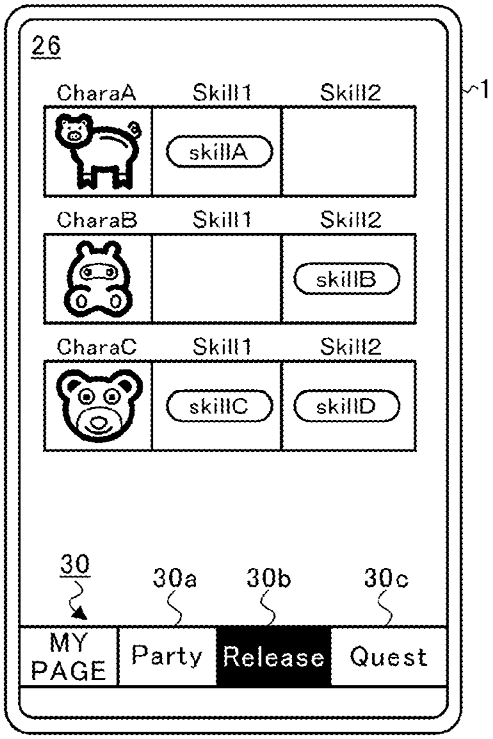
FIGS. 4A and 4B are illustrations for explaining example skill release screens.
Figure 4B:
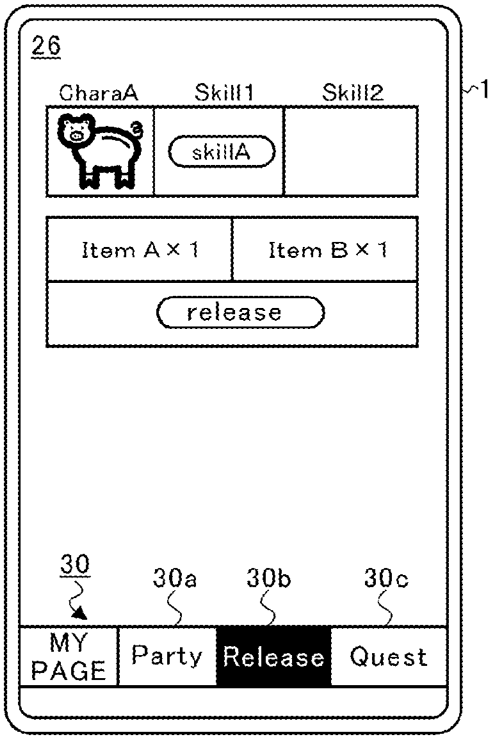

FIGS. 4A and 4B are illustrations for explaining example skill release screens. The skill release screen shown in FIG. 4A is displayed in response to an operation for selecting the skill-release selecting part 30*b* displayed in the menu bar 30.

As shown in FIG. 4A, the skill release screen displays a list of skills whose release permission conditions are satisfied. As shown in FIG. 4A, with owned character A, it is permitted to release skill A set in the frame for skill 1. Furthermore, with owned character B, it is permitted to release skill B set in the frame for skill 2. Furthermore, with owned character C, it is permitted to release skill C set in the frame for skill 1 and skill D set in the frame for skill 2.

FIG. 4B shows the skill release screen in the case where the player has performed an operation for selecting skill A of owned character A in FIG. 4A. As shown in FIG. 4B, the skill release screen displays the release condition for releasing skill A. In FIG. 4B, one item A and one item B are presented as the release condition. Item A and item B are special items for releasing skills of owned characters (skill-release special items), and the player can acquire the skill-release special items by playing battle games or the like. Furthermore, in the case where the player owns item A×1 and item B×1, a release button labelled as "release" is displayed in the skill release screen. The player can release skill A by performing an operation to select the release button.

Referring back to FIGS. 3A and 3B, the player can set a skill that has been released (hereinafter also referred to as a released skill) in a first skill setting frame 31*c* and a second skill setting frame 31*d* provided in parts of the party information of each party forming character. A skill set in the first skill setting frame 31*c* can be used as skill 3 of the owned character. Note that in some cases, as the equipment (e.g., a weapon) set in the equipment setting frame 31*a* is reinforced, a skill specific for the weapon (hereinafter referred to as a weapon skill) is assigned. In the first skill setting frame 31*c*, it is also possible to set a weapon skill of a weapon serving as equipment. Furthermore, a skill set in the second skill setting frame 31*d* can be used as skill 4 of the owned character. Note that it may be allowed to set a weapon skill not included as equipment in the first skill setting frame 31*c* (skill 3) or the second skill setting frame 31*d* (skill 4). This makes it possible to newly add two skills at most, namely, skill 3 and skill 4, in addition to skill 1 and skill 2, as skills available to an owned character. As described above, in this embodiment, the player can set a released skill as skill 3 or skill 4 of an owned character. That is, it can be said that a skill having a release permission condition (and a release condition) set therefor is a skill that is settable as skill 3 and skill 4 of an owned character. In other words, a skill having no release permission condition (and no release condition) set therefor is a skill that is not settable as skill 3 and skill 4 of an owned character.

Figure 5:
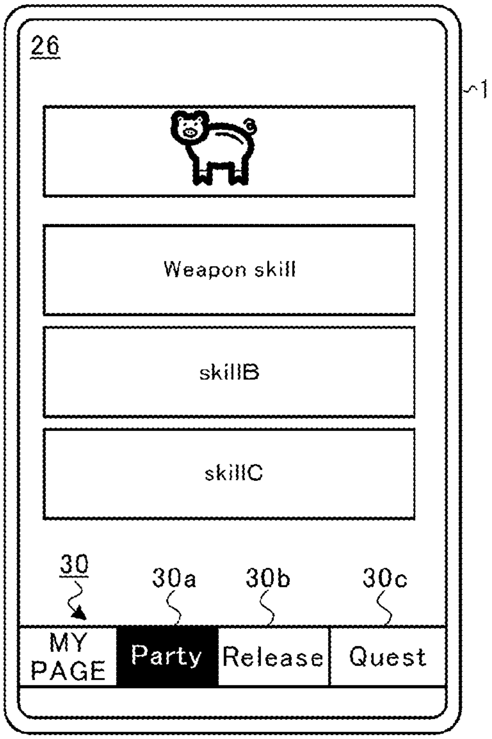
FIG. 5 is an illustration for explaining an example skill setting screen for the case where a player has performed an operation to select a first skill setting frame in FIG. 3A.

FIG. 5 is an illustration for explaining an example skill setting screen for the case where the player has performed an operation to select the first skill setting frame 31*c* in FIG. 3A. As shown in FIG. 5, a list of skills that can be set in the first skill setting frame 31*c* is displayed. In FIG. 5, "weapon skill", "skill B", and "skill C" are displayed as the skills that can be set in the first skill setting frame 31*c*. Here, in this embodiment, it is not allowed to set a plurality of skills of the same kind (skill ID) to an owned character.

For example, in the case where a released skill (skill ID) is already owned by (or is already set to) an owned character, it is not allowed to set the released skill in the first skill setting frame 31*c* or the second skill setting frame 31*d*. Specifically, in the case where the owned character has "skill A" set to skill 1 or skill 2, or in the case where the owned character has "skill A" set to skill 4, it is not allowed to set "skill A" to skill 3 of that owned character. As described above, it is not allowed to set a plurality of skills of the same kind (skill ID) to the same owned character. Alternatively, it may be allowed to set a plurality of skills of the same kind (skill ID) to the same owned character. Thus, even if "skill A" has been released, for an owned character having "skill A", "skill A" is not displayed in the list of skills that can be set in the first skill setting frame 31*c*, as shown in FIG. 5. The player can set a skill in the first skill setting frame 31*c* by performing an operation to select one of the skills from the list of skills shown in FIG. 5. In this manner, a skill serving as skill 3 is set in the first skill setting frame 31*c*.

Figure 6A:
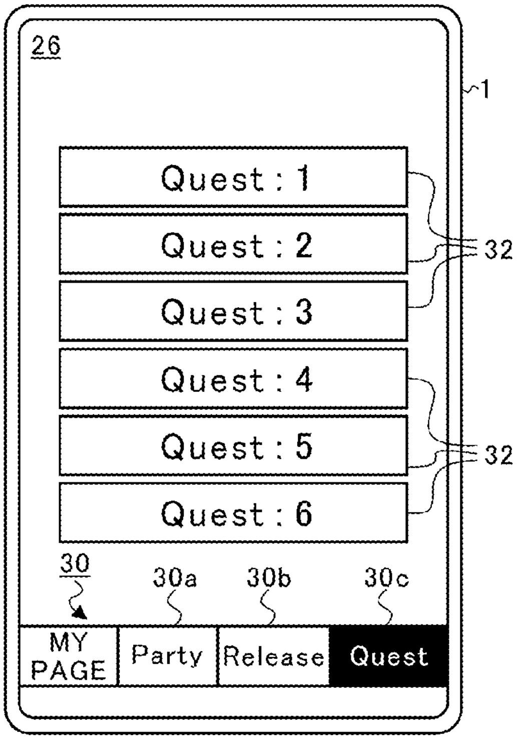
FIG. 6A is an illustration for explaining an example quest selection screen.
Figure 6B:
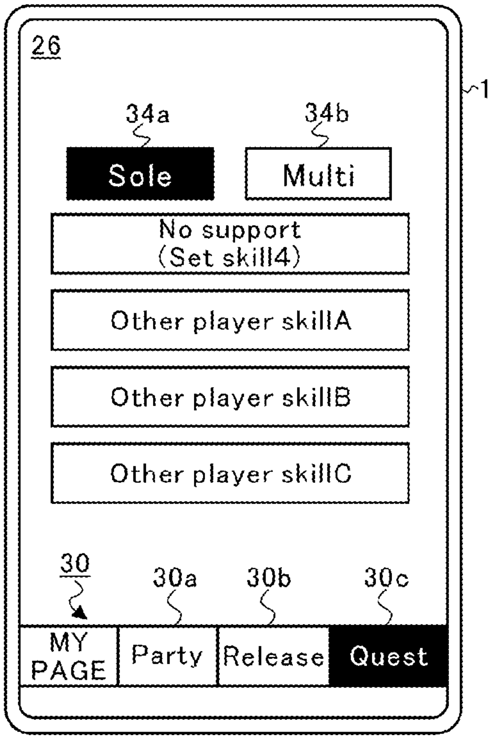
FIG. 6B is an illustration for explaining an example play-mode selection screen.
Figure 6C:
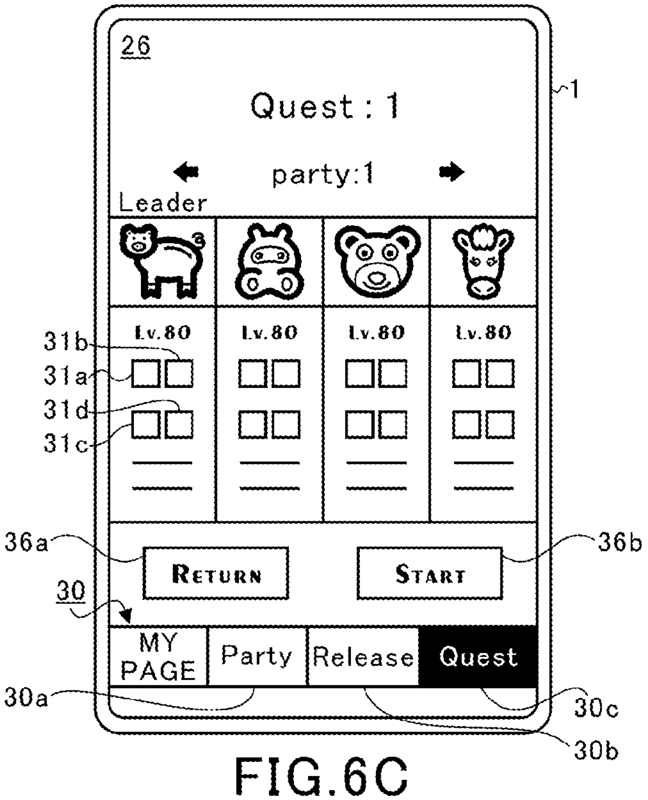
FIG. 6C is an illustration for explaining an example party selection screen.

FIG. 6A is an illustration for explaining an example quest selection screen. FIG. 6B is an illustration for explaining an example play-mode selection screen. FIG. 6C is an illustration for explaining an example party selection screen. When the quest selecting part 30*c* in the menu bar 30 is tapped, the quest selection screen shown in FIG. 6A is displayed. Here, a quest refers to a type of battle game, and can be considered as the content of a battle game. In this embodiment, a plurality of quests are provided, and a plurality of quest-selection operating parts 32 are displayed in the quest selection screen.

The player can play a battle game by tapping one of the quest-selection operating parts 32 to select one of the quests. When one of the quest-selection operating parts 32 is tapped, the play-mode selection screen shown in FIG. 6B is displayed. In the play-mode selection screen, a solo-play selecting part 34*a* and a multi-play selecting part 34*b* are displayed. For each quest, it is possible to select either solo-play, in which the player operating the player terminal 1 plays a game alone, or multi-play, in which a plurality of player terminals 1 are communicatively connected and the individual players (a plurality of players) cooperatively play a game.

Note that although the description here will be given in the context of quests for which it is possible to select both solo-play and multi-play, quests for which only solo-play is possible and quests for which only multi-play is possible may be provided. The player can select solo-play as the play mode by tapping the solo-play selecting part 34*a*, and can select multi-play as the play mode by tapping the multi-play selecting part 34*b*. The following describes the specific content of a battle game, where a battle game via solo-play will be described, while not describing a battle game via multi-play.

(Solo-Play)

When the solo-play selecting part 34*a* is tapped in the play-mode selection screen, it becomes possible to select and use the skills of owned characters owned by other players (hereinafter referred to as other-player skills) as support skills of the player, as shown in FIG. 6B. Other-player skills are skills set in advance by other players. As shown in FIG. 6B, the player can select an other-player skill from among other-player skill A set by other player A, other-player skill B set by other player B, and other-player skill C set by other player C. The selected other-player skill is set to skill 4 of the player as a support skill. Here, the priority order for the skill that is set to the frame for skill 4 is other-player skill>the skill in the second skill setting frame 31*d*. Therefore, even in the case where a skill is set in the second skill setting frame 31*d*, when an other-player skill is selected by the player, the other-player skill is set to the frame for skill 4. Note that the player need not select an other-player skill, and the skill set in the second skill setting frame 31*d* in FIGS. 3A and 3B is set to skill 4 in the case where the player does not select an other-player skill.

When skill 4 has been selected, the party selection screen shown in FIG. 6C is displayed. In the party selection screen, in which party information is displayed as shown in the figure, party information concerning the registered currently selected party is displayed at the time of transition to the party selection screen. In the party selection screen, the player can switch the party information displayed on the display 26, for example, by performing a flick operation in the horizontal direction. When the party information is switched in the party selection screen, the registered currently selected party is also changed. That is, the player can change the currently selected party in the party selection screen.

Furthermore, in the party selection screen, a return button 36*a* and a start button 36*b* are displayed. When the return button 36*a* is tapped, a screen transition occurs from the party selection screen shown in FIG. 6C to the play-mode selection screen shown in FIG. 6B. Meanwhile, when the start button 36*b* is tapped, a battle game via solo-play using the registered currently selected party is started.

Figure 7A:
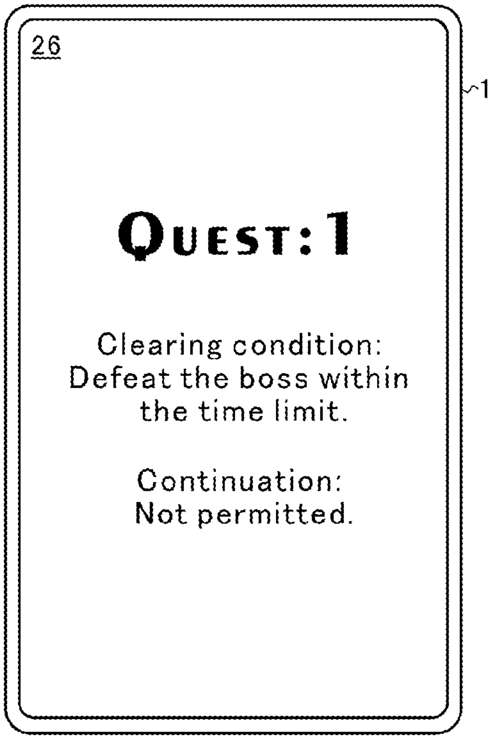
FIG. 7A is an illustration for explaining an example quest start screen.

FIG. 7A is an illustration for explaining an example quest start screen. When a battle game is started, the quest start screen is displayed, as shown in FIG. 7A. In the quest start screen, information concerning the quest (battle game) being started (quest information) is displayed. Here, as the quest information, a clearing condition for clearing the quest (also referred to as a winning condition for the player), as well as whether or not continuation is permitted, are displayed.

Each quest has set therefor a clearing condition. Here, as an example, defeating the boss character among enemy characters within a time limit is set as a clearing condition. Note that clearing conditions are set in advance for individual quests, and other example clearing conditions include annihilating all the enemy characters.

Furthermore, each quest has set therefor whether or not continuation is permitted, as well as the number of continuations permitted. In this embodiment, in a battle game via solo-play, the player is defeated on condition that all the participating characters have entered a continuation disabled state, i.e., on condition that all the participating characters have been annihilated.

Here, the state in which the HP of a participating character have become zero is defined as a continuation disabled state, and the state in which the HP of a participating character has not become zero is defined as a continuation enabled state. Participating characters in the continuation enabled state operate on the basis of operations input to the player terminal 1 or on the basis of computer control, while participating characters in the continuation disabled state are disabled from operating.

In a continuable quest, in the case where all the participating characters have been annihilated, the player can select whether or not to continue the quest by consuming a prescribed in-game currency. When the player executes continuation, all the participating characters are restored from the continuation disabled state to the continuation enabled state, which makes it possible to continue the quest (battle game).

That is, in a continuable state, when all the participating characters have been annihilated, the player's defeat is not yet determined. Therefore, the player can avoid a defeat by executing continuation. Meanwhile, in the case where the player does not execute continuation or cannot execute continuation, the player's defeat is determined when all the participating characters have been annihilated.

Figure 7B:
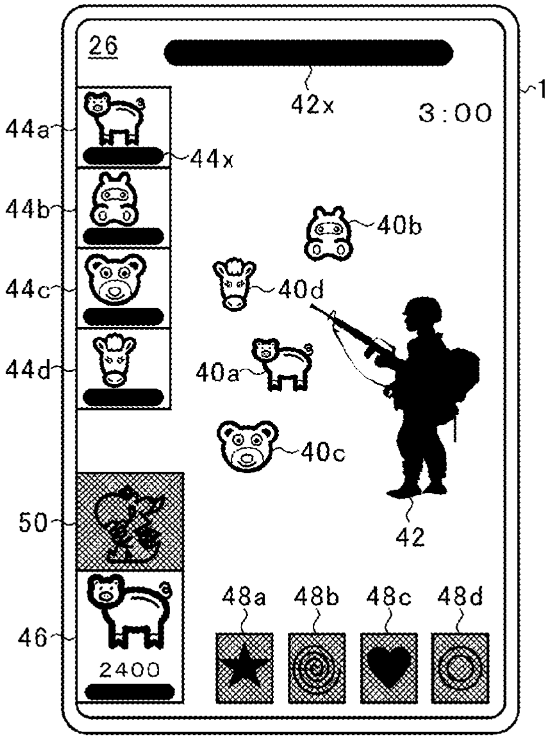
FIG. 7B is an illustration for explaining an example battle game screen during a battle game via solo-play.
Figure 7C:
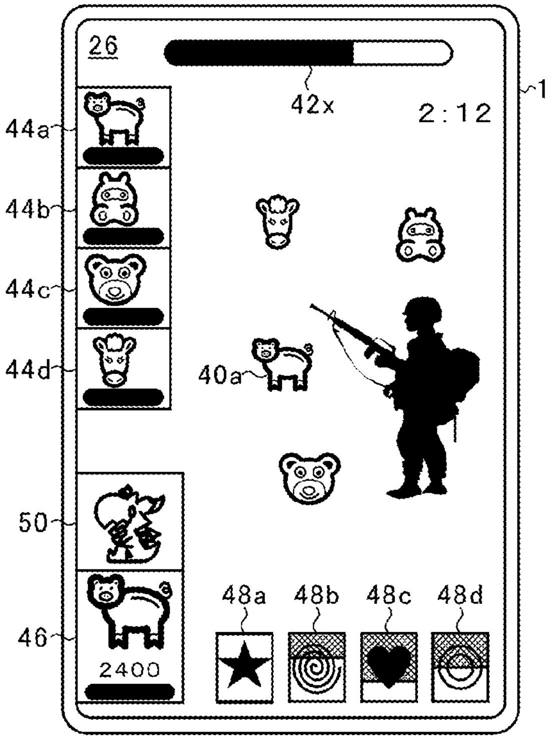
FIG. 7C is an illustration for explaining an example of skill gauges and a dragonization gauge.
Figure 7D:
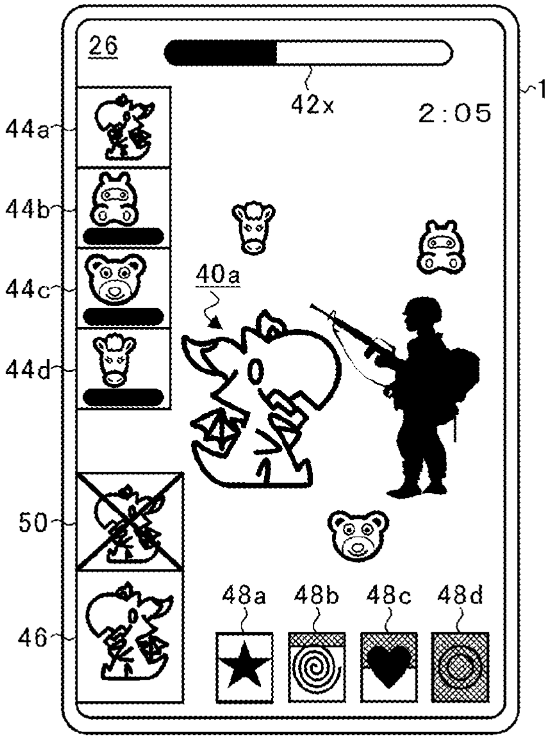
FIG. 7D is an illustration for explaining dragonization.

FIG. 7B is an illustration for explaining an example battle game screen during a battle game via solo-play. FIG. 7C is an illustration for explaining an example of skill gauges 48*a*, 48*b*, 48*c*, and 48*d* and dragonization gauge 50. FIG. 7D is an illustration for explaining dragonization. When a battle game is started and the quest start screen shown in FIG. 7A is displayed for a prescribed period, the battle game screen is displayed, as shown in FIG. 7B. In the battle game screen, a virtual game field is displayed, and a first participating character 40*a*, a second participating character 40*b*, a third participating character 40*c*, and a fourth participating character 40*d*, which are participating characters, as well as a boss character 42, which is an enemy character, are displayed in the game field. Note that the first participating character 40*a* to the fourth participating character 40*d* are the first party forming character to the fourth party forming character, respectively. Therefore, the first participating character 40*a* is a participating character registered as the leader.

In a battle game, one of the four participating characters is set as an operable character, which can be operated by the player. That is, the operable character is a participating character that operates on the basis of operations input to the player terminal 1. When a battle game is started, the participating character registered as the leader, i.e., the first participating character 40*a*, is set as the operable character.

Here, as shown in FIG. 7B, for the first participating character 40*a* registered as the leader, skill 3 set in the first skill setting frame 31*c* in FIGS. 3A and 3B is displayed as a skill gauge 48*c*. Furthermore, for the first participating character 40*a*, skill 4 set in the second skill setting frame 31*d* is displayed as a skill gauge 48*d*. Here, in the case where a weapon skill or an other-player skill is set in the first skill setting frame 31*c* (skill 3) or the second skill setting frame 31*d* (skill 4), a counter part indicating the number of times of usage of the skill may be displayed instead of the skill gauge 48*c* or 48*d*. As described above, in the battle game screen, the skill display mode may be changed depending on the type of skill set to skill 3 or skill 4, and skills may be displayed such that the numbers of times of usage thereof or the timings at which the skills become available vary. Note that skill 1 and skill 2 set to the first participating character 40*a* are displayed as skill gauges 48*a* and 48*b*.

By tapping the region where the game field is displayed in the battle game screen, the player can cause the operable character to perform an attacking action or can cause the operable character to move in the operated direction by performing a slide operation or flick operation. Meanwhile, the three participating characters, not including the operable character, operate on the basis of computer control. Hereinafter, participating characters that operate on the basis of computer control will be referred to as non-operated characters.

The player can change the operable character during a battle game. Specifically, in the battle game screen, a first character-information displaying part 44*a*, a second character-information displaying part 44*b*, a third character-information displaying part 44*c*, and a fourth character-information displaying part 44*d* are displayed as character-information displaying parts. The first character-information displaying part 44*a* to the fourth character-information displaying part 44*d* respectively correspond to the first participating character 40*a* to the fourth participating character 40*d*, and display information concerning the corresponding participating characters.

The player can switch the operable character by tapping one of the character-information displaying parts. For example, when the fourth character-information displaying part 44*d* is tapped in the state where the first participating character 40*a* is set as the operable character, the fourth participating character 40*d* is set as the operable character, and the first participating character 40*a* is set as a non-operated character. This makes it possible for the player to operate the fourth participating character 40*d* by inputting operations to the player terminal 1.

In this embodiment, during a battle game, for the second participating character 40*b*, the third participating character 40*c*, and the fourth participating character 40*d*, which are not registered as the leader, the skills set in the first skill setting frame 31*c* and the second skill setting frame 31*d* are not reflected. That is, during a battle game, the skill gauges 48*c* and 48*d* are not displayed when the second participating character 40*b*, the third participating character 40*c*, or the fourth participating character 40*d* is operated. Alternatively, during a battle game, when the second participating character 40*b*, the third participating character 40*c*, or the fourth participating character 40*d* is operated, a weapon skill that the participating character being operated is equipped with may be displayed as the skill gauge 48*c*, or an other-player skill may be displayed as the skill gauge 48*d*. Alternatively, during a battle game, when the second participating character 40*b*, the third participating character 40*c*, or the fourth participating character 40*d* is operated, skill gauges 48*c* and 48*d* for the skills set in the first skill setting frame 31*c* and the second skill setting frame 31*d* may be displayed.

Note that the individual character-information displaying parts display character images so that the corresponding participating characters can be identified, and also display HP meters 44*x* indicating the HPs of the corresponding participating characters.

Furthermore, in a lower left part of the battle game screen, an operable-character displaying part 46 is displayed separately from the character-information displaying parts. The operable-character displaying part 46 serves to report the participating character currently set as the operable character, as well as the HP of the operable character.

As described earlier, ally characters and equipment have available skills set therefor in advance. The skill gauges 48*a*, 48*b*, 48*c*, and 48*d* report the specifics of the skills available to the operable character, whether or not the use of the skills is permitted, and the gauge values remaining before the skills become available.

Specifically, each skill has set therefor in advance a gauge value that is necessary for the skill to become available. The gauge values of the skill gauges 48*a*, 48*b*, 48*c*, and 48*d* increase, for example, in accordance with the values of damage given to the boss character 42 or the like by the operable character. In the state where a gauge value is less than the necessary gauge value, the corresponding skill is not available, and the skill becomes available when the gauge value becomes greater than or equal to the necessary gauge value. The gauge values are managed on a per-skill basis, and in the state where the skills are unavailable, the skill gauges 48*a*, 48*b*, 48*c*, and 48*d* are partially or entirely grayed out, as shown in FIG. 7B. Then, as the gauge values increase and approach the necessary gauge values, the grayed-out areas decrease, as shown in FIG. 7C.

FIG. 7C shows the state in which the skill corresponding to the skill gauge 48*a* is available and the skills corresponding to the skill gauges 48*b*, 48*c*, and 48*d* are unavailable. In the state shown in FIG. 7C, the player can use the skill corresponding to the skill gauge 48*a* by tapping the skill gauge 48*a*. When the skill is used, the gauge value corresponding to the skill becomes zero, whereby the skill becomes unavailable. In this manner, the skill gauges 48*a*, 48*b*, 48*c*, and 48*d* also function as operating parts for using skills.

Furthermore, in the battle game screen, a dragonization gauge 50 is displayed. As described earlier, each participating character can be equipped with a dragon. The dragonization gauge 50 reports a dragon that the operable character is equipped with, whether or not transformation into the dragon is permitted, and the gauge value remaining before transformation into the dragon becomes possible.

Specifically, each dragon or each participating character has set therefor in advance a gauge value necessary for enabling transformation into the dragon. The gauge value of the dragonization gauge 50 increases, for example, in accordance with the value of damage given to the boss character 42 or the like by the operable character. Transformation into the dragon is not permitted in the state where the gauge value is less than the necessary gauge value, and transformation into the dragon is enabled when the gauge value becomes greater than or equal to the necessary gauge value. The gauge value necessary for transformation into the dragon is managed separately from the skills described above, and in the state where transformation into the dragon is disabled, the dragonization gauge 50 is partially or entirely grayed out, as shown in FIG. 7B. Then, as the gauge value increases and approaches the necessary gauge value, the grayed-out area decreases.

FIG. 7C shows the state in which the operable character can transform itself into the dragon that the operable character is equipped with. In the state shown in FIG. 7C, the player can transform the operable character into the dragon by tapping the dragonization gauge 50. For example, when the dragonization gauge 50 is tapped in the state shown in FIG. 7C, the operable character (the first participating character 40*a* here) transforms itself into the dragon, as shown in FIG. 7D. In this state, the dragon is displayed in the operable-character displaying part 46 and the character-information displaying part corresponding to the operable character (the first character-information displaying part 44*a* here), and the dragon can be operated by inputting operations to the player terminal 1.

Upon the transformation into the dragon, the gauge value for the dragon becomes zero, whereby transformation into the dragon is again disabled. During the period in which the operable character is transformed into the dragon, the dragonization gauge 50 is displayed in the manner shown in FIG. 7D. The period during which transformation into the dragon is enabled (transformation enabled period) is set in advance, and after the expiration of the transformation enabled period, the dragon is transformed back to the original participating character (the first participating character 40*a* here), and the dragonization gauge 50 is displayed in a grayed-out manner, as shown in FIG. 7B.

Although not described in detail, gauge values for dragons and gauge values for individual skills are also managed in relation to non-operated characters. However, with non-operated characters, although there are cases where the skills are used under computer control, transformation into a dragon does not occur.

Furthermore, in an upper part of the battle game screen, a boss-character HP meter 42*x* indicating the HP of the boss character 42, as well as a time limit, i.e., the time remaining before the end of the battle game, are displayed. Each battle game has a clearing condition (winning condition) and a defeat condition (failure to satisfy the clearing condition) set therefor in advance. The player wins when the winning condition is satisfied in the battle game, the player is defeated when the defeat condition is satisfied, and the battle game comes to an end. Here, the condition that the HP of the boss character 42 have become zero is set as the winning condition, and thus the player wins when the HP of the boss character 42 have become zero.

Figure 8A:
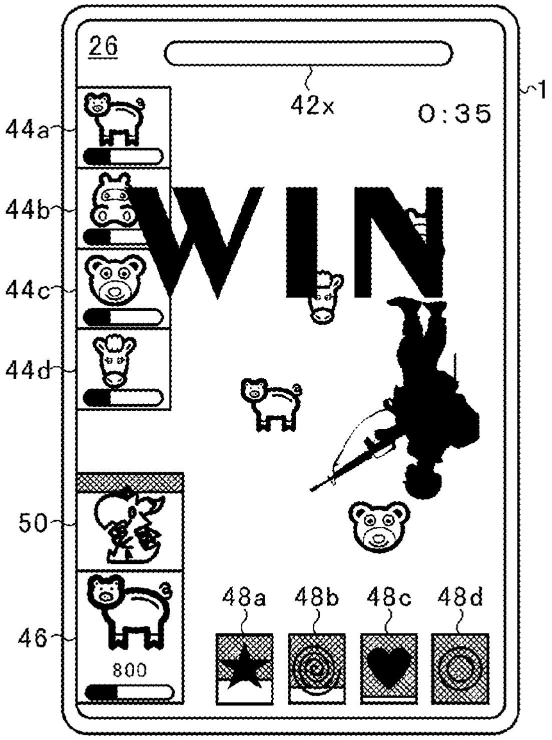
FIG. 8A is an illustration for explaining an example battle game screen for the case of a victory for a player.
Figure 8B:
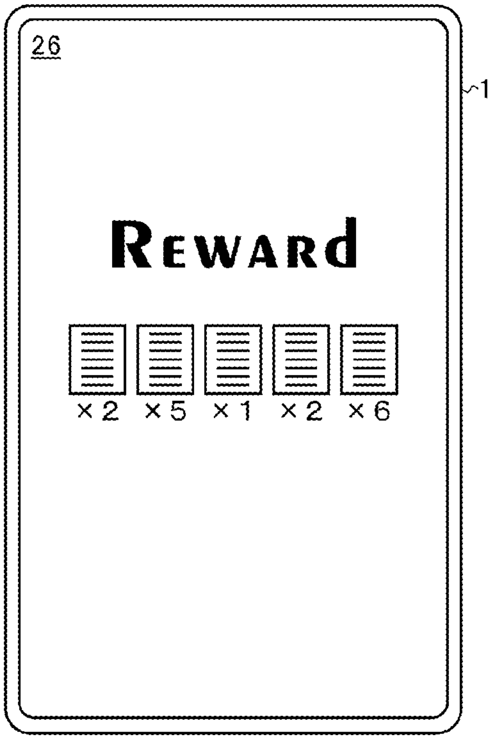
FIG. 8B is an illustration for explaining an example reward screen.

FIG. 8A is an illustration for explaining an example battle game screen for the case of a victory for the player. FIG. 8B is an illustration for explaining an example reward screen. When the HP of the boss character 42 have become zero, an image reporting a victory for the player is displayed, as shown in FIG. 8A, and the battle game comes to an end. Then, the reward screen is displayed, as shown in FIG. 8B, reporting the reward acquired as a result of the success in the quest, i.e., the victory in the battle game. The reward that can be acquired by the player varies among the individual quests, and also varies depending on the number of continuations.

The functional configuration (functional units) of the information processing system S for executing the battle game described above, as well as processes carried out by the individual functional units, will be described below in detail.

(Functional Configuration of Information Processing System S)

Figure 9:
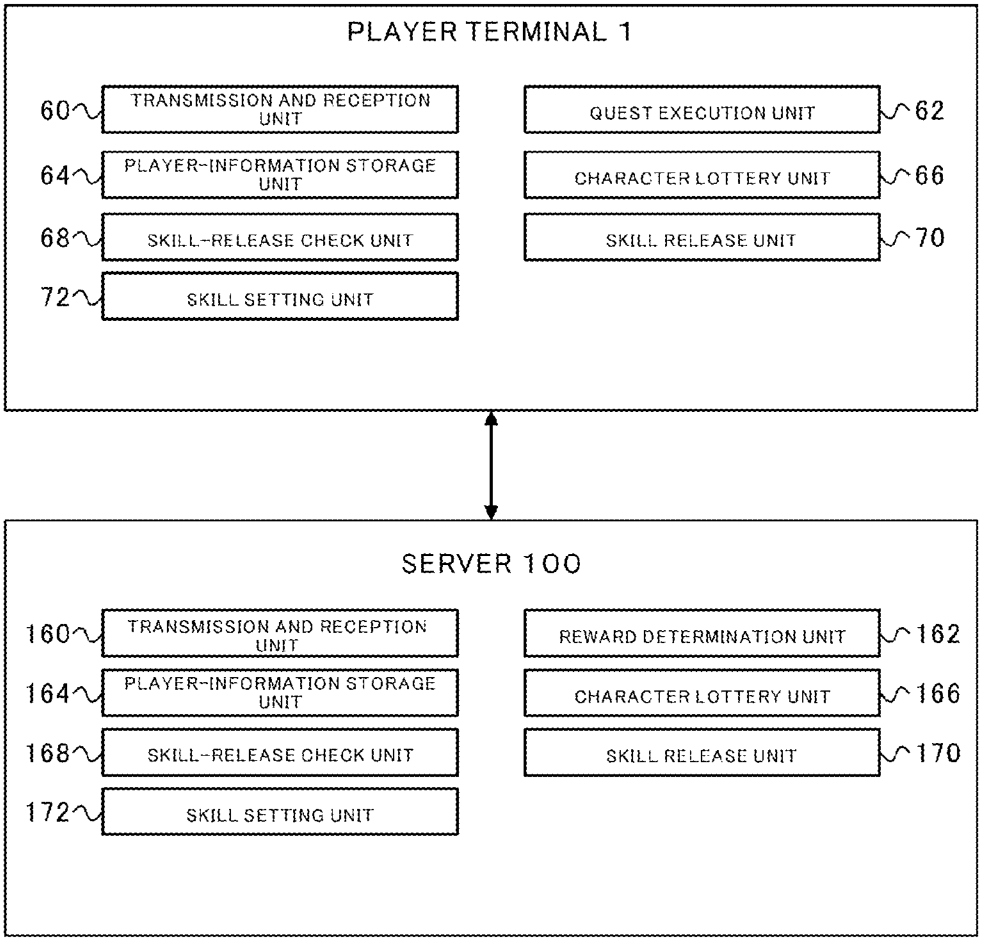
FIG. 9 is a diagram for explaining the functional configurations of the player terminal and the server.

FIG. 9 is a diagram for explaining the functional configurations of the player terminal 1 and the server 100. The memory 12 of the player terminal 1 stores programs for proceeding with games. The CPU 10 of the player terminal 1 runs the individual programs, thereby causing the player terminal 1 to function as a transmission and reception unit 60, a quest execution unit 62 (game execution unit), a player-information storage unit 64, a character lottery unit 66, a skill-release check unit (release check unit) 68, a skill release unit (release unit) 70, and a skill setting unit (setting unit) 72.

Furthermore, the server 100 runs the individual programs, thereby functioning as a transmission and reception unit 160, a reward determination unit 162, a player-information storage unit 164, a character lottery unit 166, a skill-release check unit 168, a skill release unit 170, and a skill setting unit 172.

Note that the functional units shown in FIG. 9 are merely examples, and a large number of other functional units are also provided. Furthermore, each of the functional units may be provided at either the player terminal 1 or the server 100. Furthermore, multiple functional units having the same role may be provided at the player terminal 1 and the server 100.

The transmission and reception units 60 and 160 send and receive various kinds of information between the player terminal 1 and the server 100. Furthermore, in multi-play, the transmission and reception unit 160 sends and receives information among the player terminals 1 of a plurality of players participating in games.

The quest execution unit 62 controls the proceeding of the battle game as a whole; for example, the quest execution unit 62 computes and updates the values of received damage, the HPs, and the various kinds of parameters of enemy characters and participating characters.

The reward determination unit 162 determines a reward to be assigned to the player upon a successful quest.

The player-information storage units 64 and 164 store all information concerning a player in storage units as player information. Note that in addition to the player information, the storage units store game information including game version information, list information shown in FIG. 10, etc. Examples of the player information include player IDs, owned character information shown in FIG. 11, party information shown in FIG. 12, possessed item information, the numbers of times that quests have been cleared, and information concerning nicknames of players.

The character lottery units 66 and 166, upon the transmission of lottery request information from the player terminal 1, perform lottery processing, with reference to a lottery table (not shown), to perform a lottery for an ally character that can be acquired by the player. The result of lottery by the character lottery units 66 and 166 is stored in storage units (not shown) by the player-information storage units 64 and 164 as information concerning an ally character acquired by the player, in association with the player ID.

The skill-release check units 68 and 168 check whether or not the skills of owned characters satisfy release permission conditions. For example, the skill-release check units 68 and 168 check whether or not the skills of owned characters satisfy release permission conditions on the basis of list information stored in the storage unit of the server 100.

FIG. 10 is a figure for explaining example list information. As shown in FIG. 10, the list information includes skill IDs, release permission condition information, release condition information, and cost information. The skill IDs are numbers for identifying skills assigned to skills 1 and skills 2 of ally characters.

The release permission condition information is information indicating prerequisite conditions for releasing skills of ally characters (owned characters). Here, different release permission conditions are set in accordance with the types of ally characters. For example, in the case of an owned character that is a charged character acquired through a gacha lottery, the release permission condition is a condition that the level is greater than or equal to 80 and the parameter raising level is greater than or equal to 50. Meanwhile, in the case of an owned character that is a free character distributed by the administrator, the release permission condition is a condition that the story progress level of the game has cleared 1-1 in Chapter 2 of the main story.

The release condition information is information indicating conditions for releasing skills of ally characters (owned characters), satisfying release permission conditions. Here, different release conditions are set in accordance with the types of ally characters and the kinds of skills. For example, in the case of an owned character that is a charged character acquired through a gacha lottery, the consumption of skill-release special items is set as the release condition. In FIG. 10, the consumption of item A×1 and item B×1 is set as the condition for releasing skill ID 0001 of a charged character. Furthermore, the consumption of item A×2 and item C×1 is set as the condition for releasing skill ID 0004 of a charged character. Meanwhile, in the case of an owned character that is a free character distributed by the administrator, the consumption of skill-release special items is not set as the release condition. That is, skill-release special items are not required in order to release skills of free characters.

The cost information is information indicating costs individually set to individual skills. The costs may vary or may be the same among the individual skills. Furthermore, the magnitude relationships of costs may be set in accordance with the types of owned characters. For example, the cost for a skill owned by an owned character may be set to be greater in the case where the owned character is a charged character than in the case where the owned character is a free character.

The skill-release check units 68 and 168 check whether or not the release permission conditions for owned characters are satisfied on the basis of the list information shown in FIG. 10. In the case where it is determined that release permission conditions are satisfied, corresponding skills are displayed in the skill release screen, as shown in FIG. 4A.

The skill release units 70 and 170 release a skill selected by the player performing an operation to select the release button in the skill release screen shown in FIG. 4B. Specifically, the skill release units 70 and 170 switch the flag associated with the skill ID of the owned character, included in the player information, from OFF to ON. The skill is released as a result of switching the flag to ON.

FIG. 11 is a figure for explaining example owned character information included in the player information. As shown in FIG. 11, the owned character information includes character IDs, skill IDs, and cost upper limit information. The character IDs are numbers for identifying owned characters. Note that although an example where the owned character information shown in FIG. 11 and the list information shown in FIG. 10 are configured separately is described here, without limitation to this example, the list information may be included in the owned character information. That is, the list information shown in FIG. 10 may be configured as a part of the owned character information shown in FIG. 11. Specifically, the release permission condition information, etc. shown in FIG. 10 may be stored in association with the character IDs shown in FIG. 11.

The skill IDs are numbers that are associated with the character IDs and that serve to identify skills set to the character IDs (owned characters). The skill IDs include skill 1 IDs corresponding to skills 1 and skill 2 IDs corresponding to skills 2 of owned characters. Furthermore, release permission flag 1 information and release flag 1 information are associated with the skill 1 IDs, and release permission flag 2 information and release flag 2 information are associated with the skill 2 IDs. The release permission flag 1 information and the release permission flag 2 information are switched from OFF to ON when it is determined by the skill-release check units 68 and 168 that a release permission condition is satisfied, as described earlier. The release flag 1 information and the release flag 2 information are switched from OFF to ON when a skill has been released by the skill release units 70 and 170, as described earlier. Note that the release permission flag 1 information, the release permission flag 2 information, the release flag 1 information, the release flag 2 information, etc., shown in FIG. 11, may be stored in association with the skill IDs shown in FIG. 10.

The cost upper limit information is information associated with the character IDs and indicating cost upper limit values set to the character IDs (owned characters). In this embodiment, a uniform cost upper limit value (cost 10) is set to each character ID. Without limitation thereto, however, individual cost upper limit values may be set to the individual character IDs.

FIG. 12 is a figure for explaining example party information included in the player information. As shown in FIG. 12, the party information includes a party ID, formation numbers, character IDs, and skill IDs. The party ID is a number for identifying a party formed by the player. The formation numbers indicate the order of individual ally characters forming the party. In the party formation screen shown in FIG. 3A, numbers 0001, 0002, 0003, and 0004 are set in this order from the left, and 0001 is set as the leader of the party.

The skill IDs include skill 1 IDs corresponding to skills 1, skill 2 IDs corresponding to skills 2, skill 3 IDs corresponding to skills 3, and skill 4 IDs corresponding to skills 4 of owned characters.

The skill setting units 72 and 172 set a skill released by the skill release units 70 and 170 to skill 3 or skill 4, on the basis of the list information shown in FIG. 10, the owned character information shown in FIG. 11, and the party information shown in FIG. 12. Furthermore, the skill setting units 72 and 172 can set a weapon skill to skill 3 and can set an other-player skill to skill 4.

The skill setting units 72 and 172 set a skill that is ON of the release flag 1 and the release flag 2 shown in FIG. 11 to skill 3 or skill 4 shown in FIG. 12. The skill setting units 72 and 172 can set skills to skill 3 and skill 4 within the cost upper limits set to the character IDs. In this embodiment, costs are not set to weapon skills and other-player skills. That is, the costs of weapon skills and other-player skills are zero. Without limitation thereto, however, costs of one or greater may be set to weapon skills and other-player skills.

Note that the skill setting units 72 and 172 are provided with an automatic skill setting function. For example, when the automatic skill setting function is used by the player, the skill setting units 72 and 172 automatically set a weapon skill to skill 3. Here, in the case where there is no weapon skill among weapons included as equipment of an owned character, the skill setting units 72 and 172 automatically set a skill of a free character to skill 3.

Specifically, suppose that, in FIG. 12, character ID 0001 represents charged character 1, character ID 0003 represents free character 1, character ID 0004 represents free character 2, and character ID 0005 represents free character 3. For example, the skill setting units 72 and 172 automatically set skill 1 (skill ID 0005) of free character 1 to skill 3 of charged character 1 and automatically set skill 1 (skill ID 0007) of free character 2 to skill 4 thereof. Hereinafter, skill 1 (skill ID 0005) of free character 1 will also be referred to as specific release skill 1, skill 1 (skill ID 0007) of free character 2 will also be referred to as specific release skill 2, and skill 1 (skill ID 0009) of free character 3 will also be referred to as specific release skill 3.

As described earlier, it is not allowed to set skills (skill IDs) of the same kind to the same owned character. Therefore, the skill setting units 72 and 172 cannot set specific release skill 1 (skill ID 0005) to skill 3 of free character 1. Thus, the skill setting units 72 and 172 automatically set skill 1 (skill ID 0007) of free character 2 to skill 3 of free character 1 and automatically set skill 1 (skill ID 0009) of free character 3 to skill 4 thereof. Furthermore, the skill setting units 72 and 172 automatically set skill 1 (skill ID 0005) of free character 1 to skill 3 of free character 2 and automatically set skill 1 (skill ID 0009) of free character 3 to skill 4 thereof. Furthermore, the skill setting units 72 and 172 automatically set skill 1 (skill ID 0005) of free character 1 to skill 3 of free character 3 and automatically set skill 1 (skill ID 0007) of free character 2 to skill 4 thereof.

A priority order is set to release skills of free characters. In this embodiment, the priority order is skill 1 of free character 1>skill 1 of free character 2>skill 1 of free character 3. However, the priority order of release skills of free characters is not limited thereto. For example, the priority order of release skills of free characters may be skill 1 of free character 3>skill 1 of free character 2>skill 1 of free character 1. Furthermore, in this embodiment, priority orders are also set for weapon skills and other-player skills such that the priority orders are weapon skills>release skills and other-player skills>release skills. However, the priority orders of weapon skills and other-player skills are not limited thereto. For example, the priority orders of weapon skills and other-player skills may be release skills>weapon skills and release skills>other-player skills. Furthermore, a priority order may be set between weapon skills and other-player skills.

Note that the skill setting units 72 and 172 need not set skills to skill 3 and skill 4.

Next, example processes of the information processing system S will be described. Here, example processes for realizing a battle game via solo-play will be described, while not describing a battle game via multi-play.

(Processes of Information Processing System S, Relating to Solo-Play)

Figure 13:
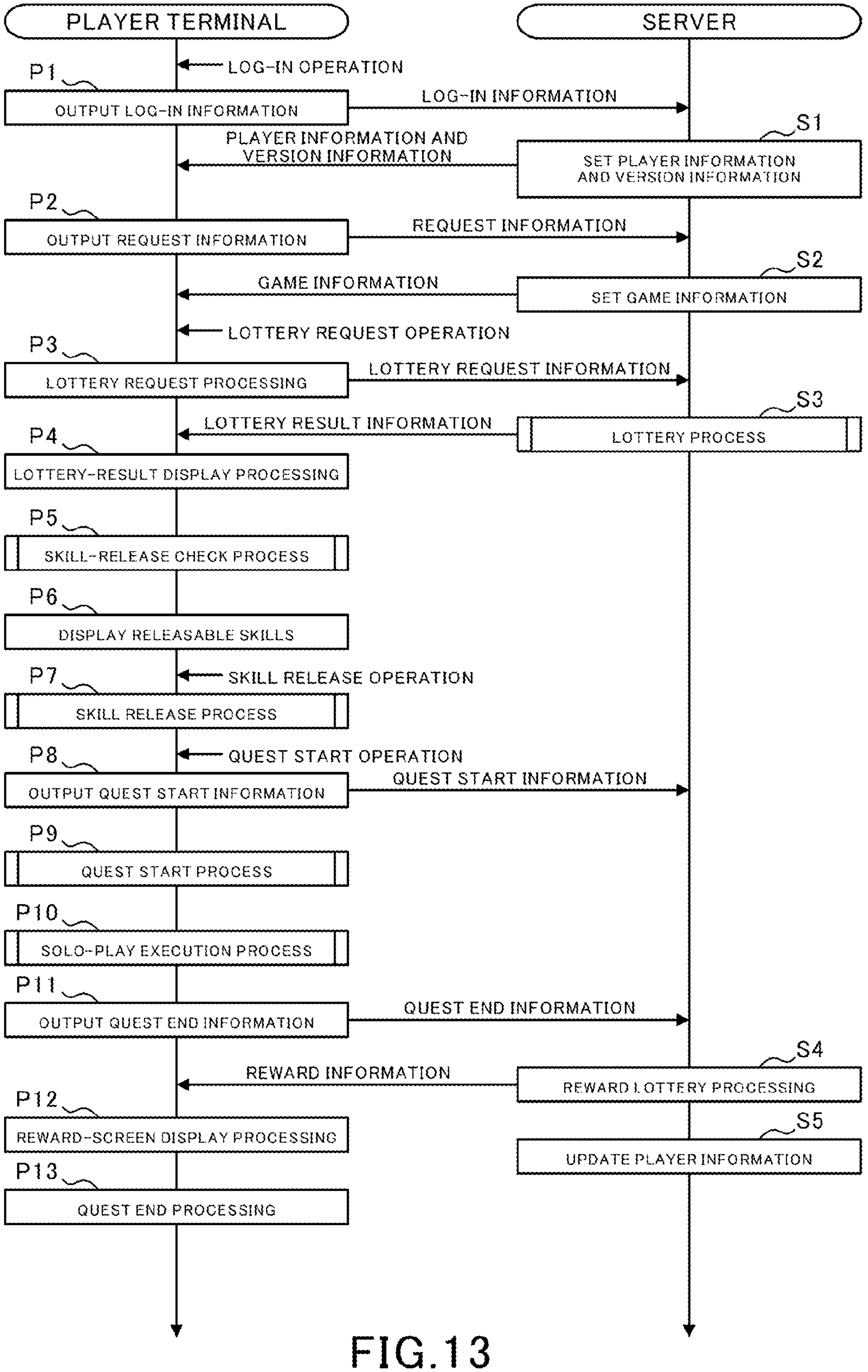
FIG. 13 is a sequence chart for explaining processes at the player terminal and the server, relating to solo-play.

FIG. 13 is a sequence chart for explaining processes at the player terminal 1 and the server 100, relating to solo-play. When a log-in operation is input to the player terminal 1, processing in which the transmission and reception unit 60 transmits log-in information to the server 100 is executed (P1). When the log-in information is received by the transmission and reception unit 160 of the server 100, various kinds of player information stored in association with the player ID, as well as game version information, are set (S1).

Upon receiving the game version information from the server 100, the player terminal 1 compares the received game version information with game version information stored in the player terminal 1. If it is determined as a result of the comparison that a game of a new version is stored in the server 100, the player terminal 1 executes processing for requesting game information of the new version to the server 100 (P2). When the request information is received by the transmission and reception unit 160 of the server 100, the game information of the new version is set (S2). The game information of the new version includes the list information shown in FIG. 10. When the game information is received from the server 100, a game image concerning an out-game is displayed on the display 26.

When the player performs an input operation (lottery request operation) in a gacha screen, which is not shown, the transmission and reception unit 60 executes lottery request processing (P3) to transmit lottery request information to the server 100. When the lottery request information is received, the character lottery unit 166 of the server 100 executes a lottery process (S3) to store lottery result information indicating the lottery result in the player-information storage unit 164 and to transmit the lottery result information to the player terminal 1. Upon receiving the lottery result information, the player terminal 1 displays the lottery result indicated by the lottery result information on the display 26 (P4).

Figure 14:
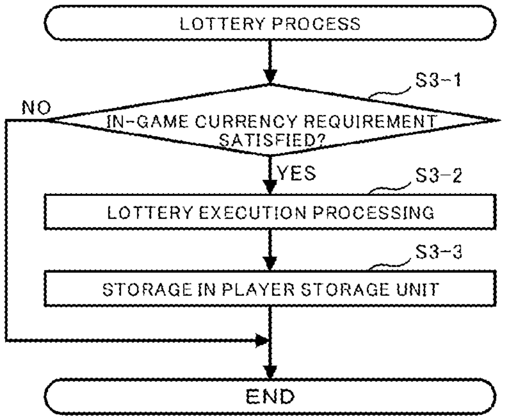
FIG. 14 is a flowchart for explaining an example lottery process.

FIG. 14 is a flowchart for explaining an example lottery process. As shown in FIG. 14, when lottery request information is received from the player terminal 1, the character lottery unit 166, on the basis of the player information, checks whether or not the requirement for the player to acquire an ally character (here, the requirement that the player owns at least a prescribed amount of the in-game currency) is satisfied (S3-1).

In the case where the in-game currency requirement is satisfied (YES in S3-1), the character lottery unit 166 executes lottery execution processing (S3-2), with reference to a lottery table, which is not shown, to determine an ally character to be acquired by the player through a lottery. Meanwhile, in the case where the in-game currency requirement is not satisfied (NO in S3-1), the character lottery unit 166 terminates the lottery process.

When the lottery execution processing is finished, the player-information storage unit 164 executes processing to store, in a storage unit (not shown), information (ally character ID) concerning the ally character acquired by the player through the lottery execution processing, in association with the player ID (S3-3).

Referring back to FIG. 13, when game information (or player information) is received by the player terminal 1, the skill-release check unit 68, on the basis of list information included in the game information (or player information), executes a process for checking whether or not skills of owned characters satisfy release permission conditions (P5).

Figure 15:
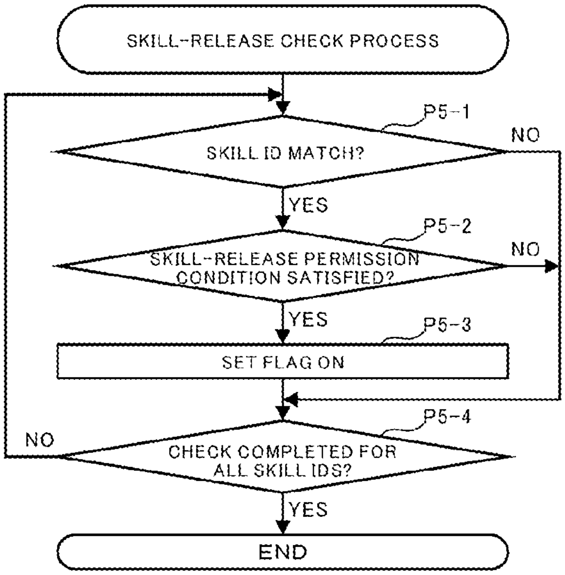
FIG. 15 is a figure for explaining an example skill-release check process.

FIG. 15 is a figure for explaining an example skill-release check process. As shown in FIG. 15, the skill-release check unit 68, on the basis of the player information, checks whether or not the skill ID of skill 1 or skill 2 set to an owned character owned by the player matches one of the skill IDs included in the list information (P5-1).

In the case where the skill ID of skill 1 or skill 2 matches one of the skill IDs included in the list information (YES in P5-1), the skill-release check unit 68, on the basis of the list information, checks whether or not the skill ID satisfies the release permission condition (P5-2). Meanwhile, in the case where the skill ID of skill 1 or skill 2 matches none of the skill IDs included in the list information (NO in P5-1), the process proceeds to processing in P5-4, which will be described later.

In the case where it is determined that the release permission condition is satisfied (YES in P5-2), the skill-release check unit 68 changes (sets) the flag (release permission flag 1 or 2 in FIG. 11) associated with the skill ID from OFF to ON (P5-3). Meanwhile, in the case where the skill-release permission condition is not satisfied (NO in P5-2), the process proceeds to processing in P5-4, which will be described later.

When the flag, which is not shown, is set to ON (P5-3), the skill-release check unit 68 checks whether or not the check processing in P5-1 has been finished for all the skill IDs of skills 1 or skills 2 set to owned characters (P5-4).

In the case where the check processing has not been finished for all the skill IDs (NO in P5-4), the process returns to the processing in P5-1, in which the check processing in P5-1 is executed again. Meanwhile, in the case where the check processing has been finished for all the skill IDs (YES in P5-4), the skill-release check process is terminated.

Referring back to FIG. 13, when an operation for selecting the skill-release selecting part 30*b* is performed in the party formation screen shown in FIGS. 3A and 3B, the skill release screen shown in FIG. 4A is displayed on the display 26. At this time, the skills for which the flags are set to ON in the skill-release check process (releasable skills) are displayed in the skill release screen on the display 26 (P6).

When an operation for selecting one of the releasable skills is performed by the player in the skill release screen shown in FIG. 4A, the skill release screen shown in FIG. 4B is displayed. Furthermore, when an operation for selecting the release button (skill release operation) is performed, the skill release unit 70 executes processing for releasing the skill selected by the operation (P7).

Figure 16:
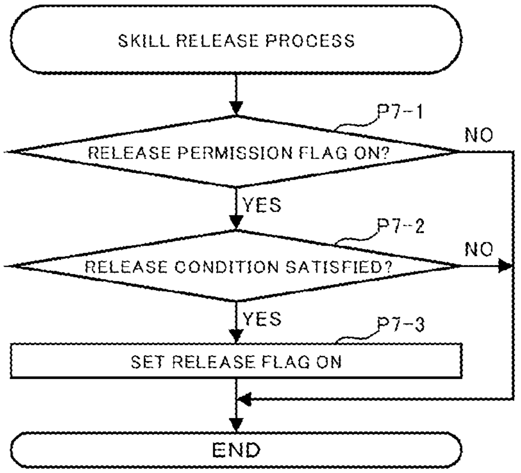
FIG. 16 is a figure for explaining an example skill release process.

FIG. 16 is a figure for explaining an example skill release process. As shown in FIG. 16, the skill release unit 70 checks whether or not the release permission flag (release permission flag 1 or release permission flag 2) of the skill selected by an operation is ON (P7-1).

In the case where the release permission flag is ON (YES in P7-1), the skill release unit 70, on the basis of the list information, checks whether or not the skill ID for which the release permission flag is ON satisfies the release condition (P7-2). Meanwhile, in the case where the release permission flag is not ON (NO in P7-1), the skill release process is terminated.

In the case where it is determined that the release condition is satisfied (YES in P7-2), the skill release unit 70 changes (sets) the release flag (release flag 1 or 2 in FIG. 11) associated with the skill ID from OFF to ON (P7-3), and terminates the skill release process. Meanwhile, in the case where the release condition is not satisfied (NO in P7-2), the skill release process is terminated.

Here, when an operation for selecting the first skill setting frame 31*c* or the second skill setting frame 31*d* is performed by the player in the party formation screen shown in FIGS. 3A and 3B, the skill setting screen shown in FIG. 5 is displayed. In the skill setting screen, it is possible, via the skill setting unit 72, to set a weapon skill or a released skill in the first skill setting frame 31*c* or the second skill setting frame 31*d*.

Referring back to FIG. 13, after a quest is selected in the quest selection screen (see FIG. 6A), solo-play is selected as the play mode in the play-mode selection screen (see FIG. 6B). Then, when a quest start operation (tapping of the start button 36*b*) is input in the party selection screen (see FIG. 6C), quest start information is transmitted from the player terminal 1 to the server 100 (P8), and a quest start process (P9) is executed. The quest start information includes party information concerning the currently selected party and the type of quest selected.

Figure 17:
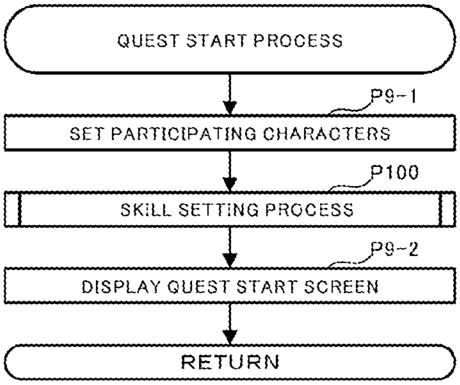
FIG. 17 is a flowchart for explaining a quest start process at the player terminal.

FIG. 17 is a flowchart for explaining the quest start process at the player terminal 1. In the quest start process, on the basis of the party information of the currently selected party, the quest execution unit 62 sets the first party forming character to the fourth party forming character as the first participating character 40*a* to the fourth participating character 40*d*, respectively (P9-1). Furthermore, here, the quest execution unit 62 sets the first party forming character as the operable character and sets the other party forming characters as non-operated characters. Then, the skill setting unit 72 executes a process for setting release skills, weapon skills or other-player skills in the frames for skill 3 and the frames for skill 4 of the party forming characters (P100).

Figure 18:
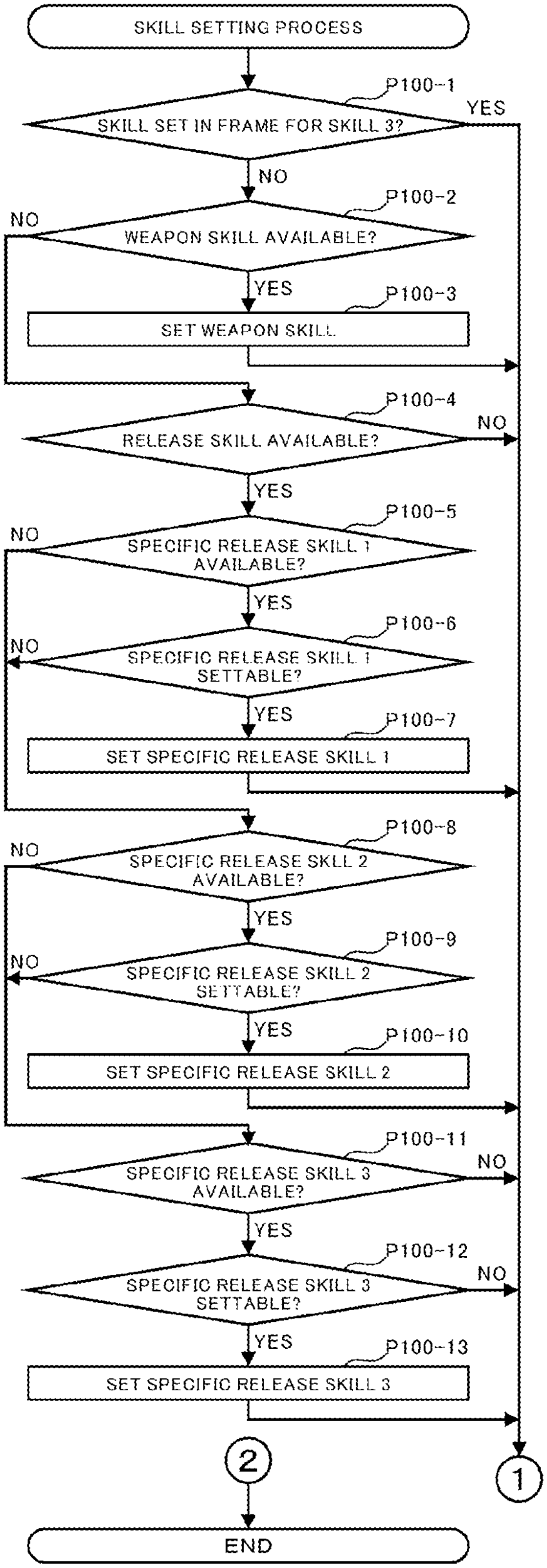
FIG. 18 is a first flowchart for explaining an example skill setting process.
Figure 19:
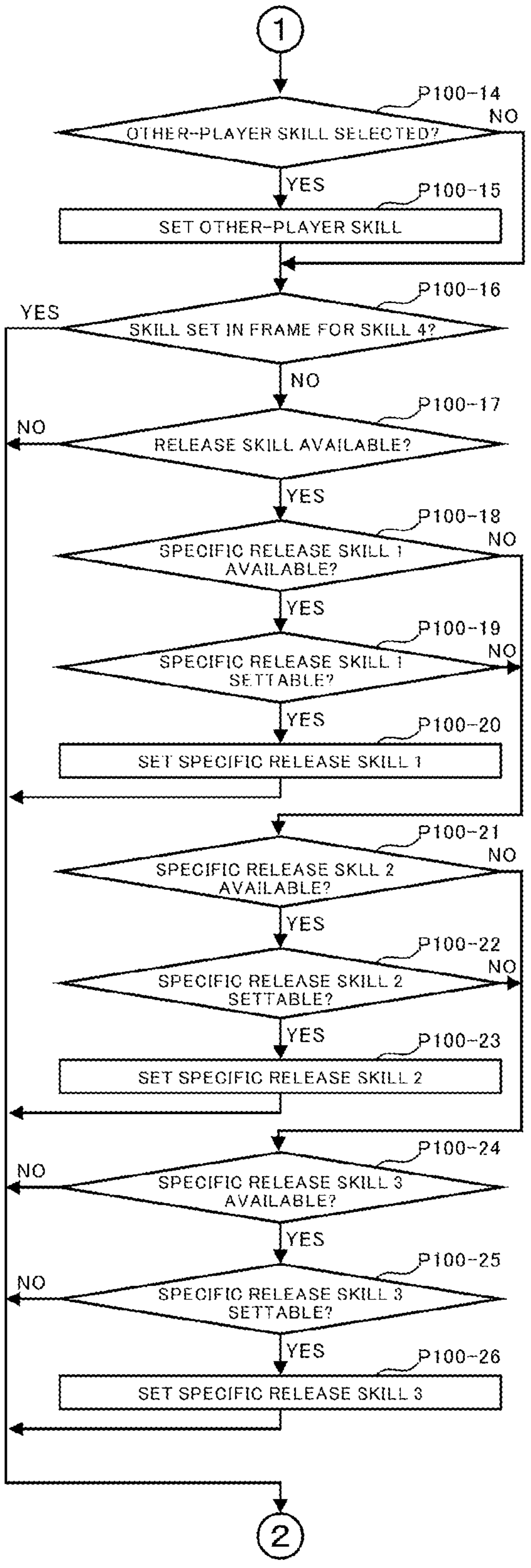
FIG. 19 is a second flowchart for explaining the skill setting process.

FIG. 18 is a first flowchart for explaining an example skill setting process. FIG. 19 is a second flowchart for explaining the example skill setting process. As shown in FIG. 18, the skill setting unit 72 first checks whether or not a skill (skill ID) is set to the frame for skill 3 of each owned character, such as those shown in FIG. 12 (P100-1).

In the case where no skill is set to the frame for skill 3 (NO in P100-1), the skill setting unit 72 checks whether or not the weapon that the owned character is equipped with has a weapon skill (P100-2). Meanwhile, in the case where a skill is set to the frame for skill 3 (YES in P100-1), the skill setting unit 72 causes the process to proceed to P100-14, which will be described later.

In the case where the equipment weapon has a weapon skill (YES in P100-2), the skill setting unit 72 sets a weapon skill in the frame for skill 3 (P100-3), and causes the process to proceed to P100-14, which will be described later. Meanwhile, in the case where the equipment weapon does not have any weapon skill (NO in P100-2), the skill setting unit 72, on the basis of the player information, checks whether or not there is any released skill (skill ID) released by the skill release unit 70 (P100-4).

In the case where there is any released skill (YES in P100-4), the skill setting unit 72 checks whether or not specific release skill 1, described earlier, is available (here, skill 1 of free character 1 has been released) (P100-5). Meanwhile, in the case where there is no released skill (NO in P100-4), the skill setting unit 72 causes the process to proceed to P100-14, which will be described later.

In the case where specific release skill 1 is available (YES in P100-5), the skill setting unit 72 checks whether or not specific release skill 1 is settable in the frame for skill 3 (P100-6). For example, in the case where specific release skill 1 is set in a frame other than the frame for skill 3 (one of the frame for skill 1, the frame for skill 2, and the frame for skill 4) of the owned character, the skill setting unit 72 determines that specific release skill 1 is not settable in the frame for skill 3. Furthermore, in the case where the cost upper limit shown in FIG. 11 would be exceeded when specific release skill 1 were set in the frame for skill 3 of the owned character, the skill setting unit 72 determines that specific release skill 1 is not settable in the frame for skill 3. Furthermore, in the case where specific release skill 1 is not set in any of the frame for skill 1, the frame for skill 2, and the frame for skill 4 of the owned character and the cost upper limit would not be exceeded when specific release skill 1 were set, the skill setting unit 72 determines that specific release skill 1 is settable in the frame for skill 3. Meanwhile, in the case where specific release skill 1 is not available (NO in P100-5), the skill setting unit 72 proceeds to processing in P100-8, which will be described later.

In the case where specific release skill 1 is settable (YES in P100-6), the skill setting unit 72 sets specific release skill 1 in the frame for skill 3 (P100-7), and proceeds to processing in P100-14, which will be described later. Meanwhile, in the case where specific release skill 1 is not settable (NO in P100-6), the skill setting unit 72 checks whether or not specific release skill 2 is available (here, whether or not skill 1 of free character 2 has been released) (P100-8).

In the case where specific release skill 2 is available (YES in P100-8), the skill setting unit 72 checks whether or not specific release skill 2 is settable in the frame for skill 3 (P100-9). The method of checking in P100-9 is the same as the method of checking in P100-6, and thus will not be described. Meanwhile, in the case where specific release skill 2 is not available (NO in P100-8), the skill setting unit 72 proceeds to processing in P100-11, which will be described later.

In the case where specific release skill 2 is settable (YES in P100-9), the skill setting unit 72 sets specific release skill 2 in the frame for skill 3 (P100-10), and proceeds to processing in P100-14, which will be described later. Meanwhile, in the case where specific release skill 2 is not settable (NO in P100-9), the skill setting unit 72 checks whether or not specific release skill 3 is available (here, whether or not skill 1 of free character 3 has been released) (P100-11).

In the case where specific release skill 3 is available (YES in P100-11), the skill setting unit 72 checks whether or not specific release skill 3 is settable in the frame for skill 3 (P100-12). The method of checking in P100-12 is the same as the method of checking in P100-6, and thus will not be described. Meanwhile, in the case where specific release skill 3 is not available (NO in P100-11), the skill setting unit 72 causes the process to proceed to P100-14, which will be described later.

In the case where specific release skill 3 is settable (YES in P100-12), the skill setting unit 72 sets specific release skill 3 in the frame for skill 3 (P100-13), and proceeds to processing in P100-14, which will be described later. Meanwhile, in the case where specific release skill 3 is not settable (NO in P100-12), the skill setting unit 72 causes the process to proceed to P100-14, which will be described later.

Then, as shown in FIG. 19, the skill setting unit 72 checks whether or not one of the support skills (other-player skills) shown in FIG. 6B is selected by the player (P100-14). In the case where an other-player skill is selected (YES in P100-14), the skill setting unit 72 sets the other-player skill in the frame for skill 4 of the owned character shown in FIG. 12 (P100-15), and proceeds to processing in P100-16, which will be described later.

In the case where no other-player skill is selected (NO in P100-14), the skill setting unit 72 checks whether or not a skill (skill ID) is set in the frame for skill 4 of the owned character (P100-16).

In the case where no skill is set in the frame for skill 4 (NO in P100-16), the skill setting unit 72, on the basis of the player information, checks whether or not there is any released skill released by the skill release unit 70 (P100-17). Meanwhile, in the case where a skill is set in the frame for skill 4 (YES in P100-16), the skill setting unit 72 terminates the automatic skill setting process.

In the case where there is any released skill (YES in P100-17), the skill setting unit 72 checks whether or not specific release skill 1 is available (P100-18). Meanwhile, in the case where there is no released skill (NO in P100-17), the skill setting unit 72 terminates the automatic skill setting process.

In the case where specific release skill 1 is available (YES in P100-18), similarly to the processing in P100-6, the skill setting unit 72 checks whether or not specific release skill 1 is settable in the frame for skill 4 (P100-19). Meanwhile, in the case where specific release skill 1 is not available (NO in P100-18), the skill setting unit 72 proceeds to processing in P100-21, which will be described later.

In the case where specific release skill 1 is settable (YES in P100-19), the skill setting unit 72 sets specific release skill 1 in the frame for skill 4 (P100-20), and terminates the automatic skill setting process. Meanwhile, in the case where specific release skill 1 is not settable (NO in P100-19), the skill setting unit 72 checks whether or not specific release skill 2 is available (P100-21).

In the case where specific release skill 2 is available (YES in P100-21), similarly to the processing in P100-9, the skill setting unit 72 checks whether or not specific release skill 2 is settable in the frame for skill 4 (P100-22). Meanwhile, in the case where specific release skill 2 is not available (NO in P100-21), the skill setting unit 72 proceeds to processing in P100-24, which will be described later.

In the case where specific release skill 2 is settable (YES in P100-22), the skill setting unit 72 sets specific release skill 2 in the frame for skill 4 (P100-23), and terminates the automatic skill setting process. Meanwhile, in the case where specific release skill 2 is not settable (NO in P100-22), the skill setting unit 72 checks whether or not specific release skill 3 is available (P100-24).

In the case where specific release skill 3 is available (YES in P100-24), similarly to the processing in P100-12, the skill setting unit 72 checks whether or not specific release skill 3 is settable in the frame for skill 4 (P100-25). Meanwhile, in the case where specific release skill 3 is not available (NO in P100-24), the skill setting unit 72 terminates the automatic skill setting process.

In the case where specific release skill 3 is settable (YES in P100-25), the skill setting unit 72 sets specific release skill 3 in the frame for skill 4 (P100-26), and terminates the automatic skill setting process. Meanwhile, in the case where specific release skill 3 is not settable (NO in P100-25), the skill setting unit 72 terminates the automatic skill setting process.

Referring back to FIG. 17, the quest execution unit 62 displays the quest start screen (see FIG. 7A) on the display 26 (P9-2). Referring back to FIG. 13, when the quest start process is finished, the quest execution unit 62 starts a solo-play execution process (P10).

Figure 20:
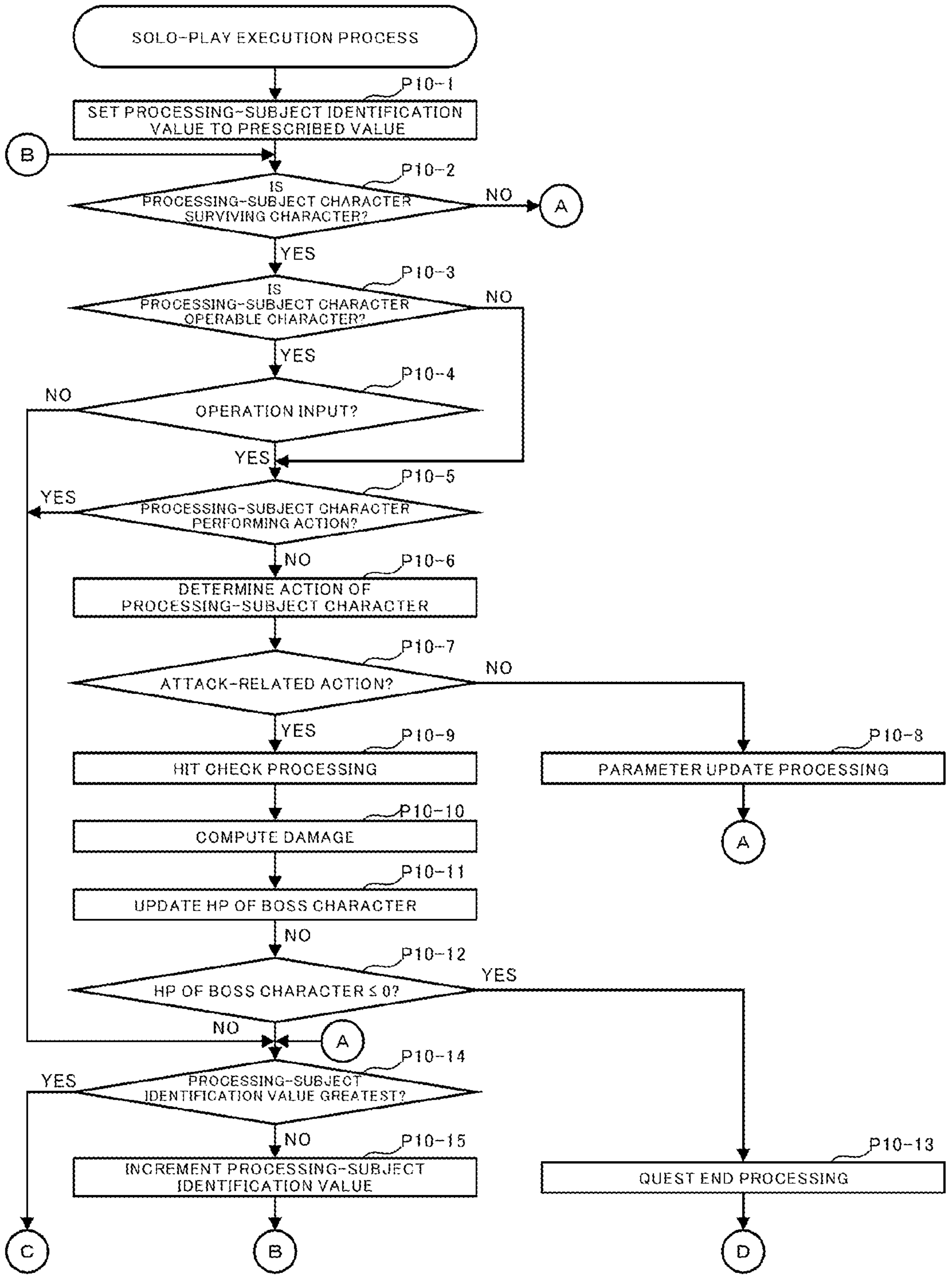
FIG. 20 is a first flowchart for explaining a solo-play execution process at the player terminal.
Figure 21:
FIG. 21 is a second flowchart for explaining the solo-play execution process at the player terminal.

FIG. 20 is a first flowchart for explaining the solo-play execution process at the player terminal 1. FIG. 21 is a second flowchart for explaining the solo-play execution process at the player terminal 1. The solo-play execution process described below is executed repeatedly for individual frames (at image update intervals) of the player terminal 1 until solo-play is terminated. Furthermore, in the context of this embodiment, descriptions will be directed to processing relating to the boss character, while omitting descriptions of processing relating to enemy characters other than the boss character.

The quest execution unit 62 sets a processing-subject identification value to a prescribed value, the processing-subject identification value serving to identify a participating character (P10-1). For example, four values, namely, 00H to 03H, are set as processing-subject identification values, of which 00H corresponds to the first participating character 40*a*, 01H corresponds to the second participating character 40*b*, 02H corresponds to the third participating character 40*c*, and 03H corresponds to the fourth participating character 40*d*. Here, 00H is set as the prescribed value.

The quest execution unit 62 checks whether or not the processing-subject character (the participating character corresponding to the processing-subject identification value) is a surviving character (P10-2). Furthermore, in the case where the processing-subject character is not surviving (NO in P10-2), it is checked whether or not the processing-subject identification value is the greatest (03H here) (P10-14). If the processing-subject identification value is the greatest (YES in P10-14), i.e., if the processing for all the participating characters has been finished, the process proceeds to P10-21, which will be described later. If the processing-subject identification value is not the greatest (NO in P10-14), i.e., if the processing for all the participating characters has not been finished, the processing-subject identification value is incremented (P10-15), and the process is repeated from P10-2.

If the processing-subject character is surviving (YES in P10-2), it is checked whether or not the processing-subject character is an operable character (P10-3). If the processing-subject character is an operable character (YES in P10-3), it is checked whether or not an operation has been input at the player terminal 1 (P10-4). If no operation has been input (NO in P10-4), the process proceeds to P10-14. Meanwhile, in the case where the processing-subject character is an operable character and an operation has been input (YES in P10-4), and in the case where the processing-subject character is a non-operated character (NO in P10-3), it is checked whether or not the processing-subject character is performing an action (P10-5). If the processing-subject character is performing an action (YES in P10-5), the process proceeds to P10-14.

Meanwhile, if the processing-subject character is not performing an action (NO in P10-5), the quest execution unit 62 determines an action of the processing-subject character (P10-6). For example, if the processing-subject character is an operable character, an attacking action, a moving action, the use of a skill, dragonization, or the like of the processing-subject character is determined on the basis of an input operation. Furthermore, for example, if the processing-subject character is a non-operated character, an attacking action, a moving action, the use of a skill, or the like of the processing-subject character is determined on the basis of a prescribed action program for non-operated characters. The quest execution unit 62 checks whether or not the determined action is an attack-related action (P10-7).

If the determined action is not an attack-related action (NO in P10-7), various kinds of parameters are updated as needed (P10-8), and the process proceeds to P10-14. Note that attack-related actions include the use of a skill that gives damage to the boss character, in addition to attacking actions. In the case where an attack-related action is determined (YES in P10-7), the quest execution unit 62 performs hit check processing for checking whether the attack has hit the boss character (P10-9), computes the damage that is given to the boss character (P10-10), and updates the HP of the boss character by subtracting the computed damage from the HP of the boss character (P10-11). The quest execution unit 62 checks whether or not the updated HP of the boss character is less than or equal to zero (P10-12).

Then, if the HP of the boss character is not less than or equal to zero (NO in P10-12), the process proceeds to P10-14. Meanwhile, if the HP of the boss character is less than or equal to zero (YES in P10-12), quest end processing for finishing the quest is performed (P10-13). In the quest end processing, quest end information indicating that the quest has been finished is set.

When the processing for all the participating characters is finished (YES in P10-14), the quest execution unit 62 checks whether or not the boss character is performing an action (P10-21), as shown in FIG. 21. If the boss character is performing an action (YES in P10-21), the game screen, i.e., the frame, on the display 26 is updated (P10-33), and the solo-play execution process is finished. If the boss character is not performing an action (NO in P10-21), an action of the boss character is determined on the basis of a prescribed action program for the boss character (P10-22). The quest execution unit 62 checks whether or not the determined action is an attack-related action (P10-23).

If the determined action is not an attack-related action (NO in P10-23), various kinds of parameters are updated as needed (P10-24), and the process proceeds to P10-33. Note that attack-related actions include special attacking actions that give damage to participating characters, in addition to normal attacking actions. In the case where an attack-related action is determined (YES in P10-23), the quest execution unit 62 performs hit check processing for checking whether or not the attack has hit a participating character (P10-25), computes the damage that is given to the participating character (P10-26), and updates the HP of the participating character hit by the attack (damaged character) by subtracting the computed damage from the HP of the damaged character (P10-27). Note that an attack may simultaneously hit a plurality of participating characters. In this case, subtraction from the HPs of the plurality of damaged characters is performed. The quest execution unit 62 checks whether or not the updated HP of the damaged character (participating character) is less than or equal to zero (P10-28).

If the HP of the damaged character is not less than or equal to zero (NO in P10-28), the process proceeds to P10-33. Meanwhile, if the HP of the damaged character is less than or equal to zero (YES in P10-28), it is checked whether or not there is any surviving character among the participating characters (P10-29). If there is no surviving character (NO in P10-29), it is determined that all the participating characters participating in the battle game have been annihilated, and quest end processing for finishing the quest is performed (P10-32). In the quest end processing, quest end information indicating that the quest has been finished is set.

Meanwhile, in the case where there is any surviving character (YES in P10-29), it is checked whether or not the damaged character whose HP has become less than or equal to zero is an operable character (P10-30). In the case where the HP of the operable character is less than or equal to zero (YES in P10-30), the operable character is changed (P10-31), and the process proceeds to P10-33. In the case where the HP of the operable character is not less than or equal to zero, the process proceeds to P10-33.

Referring back to FIG. 13, when the battle game via solo-play is finished, at the server 100, the reward determination unit 162 executes reward lottery processing (S4) on the basis of the quest end information. The reward determination unit 162 determines a base reward by using a base reward lottery table (not shown), and determines a number-of-continuations reward by using a number-of-continuations reward lottery table (not shown) on the basis of information indicating the number of continuations permitted, which is transmitted when the quest is finished.

The player-information storage unit 164, on the basis of the rewards determined by the reward determination unit 162, updates the player information at the server 100 so as to update quest clearing information, reward related information, etc. (S5). At the player terminal 1, on the basis of reward information received from the server 100, reward-screen display processing for displaying a reward screen (see FIG. 8B) is executed (P12), and the quest is finished (P13).

As described above, according to this embodiment, the player-information storage units 64 and 164 store, as possessed characters (owned characters) of the player, characters whose possession conditions are satisfied among a plurality of characters having set therefor possession conditions for possession by the player and special abilities (skills) that can be invoked in a prescribed game. Furthermore, the skill release units 70 and 170 store release completion information of a special ability of a first character (charged character) on the basis of the satisfaction of a first release condition, the first character having set therefor a first possession condition as the possession condition, and store release completion information of a special ability of a second character (free character) on the basis of the satisfaction of a second release condition, which is different from the first release condition, the second character having set therefor a second possession condition, which is different from the first possession condition. The skill setting units 72 and 172 at least set the special abilities of the first character and the second character for which release completion information is stored so that the special abilities can be invoked by other characters in a prescribed game.

As described above, in this embodiment, a release condition (first release condition) for releasing a skill (first special ability) of a charged character (first character) varies from a release condition (second release condition) for releasing a skill (second special ability) of a free character (second character). Here, the second release condition is set to be less difficult than the first release condition. In other words, a skill of a free character is set to be released more easily than a skill of a charged character. Here, it is often the case that charged characters are designed to own strong skills compared with free characters. Thus, skills that are used by players more frequently (that are more convenient and stronger) are set such that it becomes more difficult to release the skills. For example, the number of requirements included in the second release conditions is fewer than the number of requirements included in the first release condition. This results in a difference as to how easily skills can be released, which makes it possible to make skills other than specific skills easier to release. For example, by lowering the difficulty level of the release condition for free characters, it becomes possible to allow players to casually experience the game intricacy of setting skills of other characters to skill 3 and skill 4, and it becomes possible to encourage players to have interests in charged characters for making it possible to set a greater variety of skills. This makes it possible to increase the variety of the kinds of released skills that can be set to owned characters, which makes it possible to increase the range of strategies, serving to enhance game intricacy.

Note that the skill performance (ability performance) of a released skill (released ability) released by the skill release unit 70 corresponds to the skill performance (ability performance) of a skill (special ability) serving as a release source. Specifically, in the case where skill A of charged character A is released and skill A released (released skill A) is set to charged character B, the performance of released skill A set to charged character B is the same as the performance of skill A owned by charged character A. Here, the performance of a skill of an owned character is enhanced by reinforcing the skill (raising the owned character). Thus, by reinforcing a skill that serves as a release source, the performance of the released skill is also enhanced. This makes it possible to increase motivation for a player to reinforce skills of owned characters. Without limitation thereto, however, the skill performance of a released skill may be varied from the skill performance of a skill serving as a release source.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

. . . makes it possible to acquire.

In the embodiment described above, the sharing of processes executed at the player terminal 1 and the server 100 is merely an example. For example, although hit check, damage value computation, etc. are executed at the player terminal 1 in the embodiment described above, such processing may be executed at the server 100. In either case, it suffices for each process described above to be executed at one of or both the player terminal 1 and the server 100, and there is no particular limitation as to the timings of execution thereof or the device that executes the process.

The above-described embodiment has been described in the context of an example where each skill (special ability) of an owned character is a skill that is invoked by a player performing a tap operation on a skill operating part (e.g., skill gauge 48*a*, 48*b*, 48*c*, or 48*d*), as described with reference to FIG. 7C. Without limitation thereto, however, the skills (special abilities) of an owned character may include a passive skill. For example, each skill of an owned character may be a skill that is invoked without requiring a player operation, such as a skill that is invoked at the start of a battle game, a skill that is invoked after the elapse of a certain time from the start of the battle game, and a skill that is constantly invoked since the start of the battle game.

The above-described embodiment has been described in the context of an example where a charged character is acquired by consuming an in-game currency. Without limitation thereto, however, a charged character may be acquired without consuming an in-game currency.

The above-described embodiment has been described in the context of an example where a release permission condition and a release condition set to a charged character differ from a release permission condition and a release condition set to a free character. Without limitation thereto, however, a release permission condition or a release condition of some free characters may be the same as a release permission condition or a release condition of a charged character.

The above-described embodiment has been described in the context of an example where the number of requirements included in a release condition for a skill of a free character is less than the number of requirements included in a release condition for a skill of a charged character. Without limitation thereto, however, the number of requirements included in a release condition for a skill of a free character may be equal to or may be greater than the number of requirements included in a release condition for a skill of a charged character.

Note that an information processing program for executing the processes in the embodiment described above may be stored in a computer-readable storage medium and may be provided in the form of the storage medium. Furthermore, a game terminal device including this storage medium may be provided. Alternatively, the embodiment described above may be embodied in the form of an information processing method for realizing the individual functions and the steps shown in the flowcharts.

A first aspect of the present disclosure includes a non-transitory computer-readable medium storing a program, the program causing a computer to execute:

storing, in a storage unit, characters for which an acquisition condition is satisfied, as possessed characters, among a plurality of characters including a first character and a second character, each of the plurality of characters including the acquisition condition for acquiring that character, a special ability that is available in a prescribed game, and a release condition for releasing the special ability;

releasing the special ability of the first character in the case where the release condition of the first character is satisfied;

releasing the special ability of the second character in the case where the release condition of the second character is satisfied, the acquisition condition of the second character being different from the acquisition condition of the first character, and the release condition of the second character being different from the release condition of the first character; and in the case where the special ability of at least either of the first character and the second character is released, setting the released special ability such that the released special ability is available to other characters in the prescribed game.

In the first aspect:

the acquisition condition of the first character may include the consumption of an in-game currency; and the acquisition condition of the second character need not include the consumption of the in-game currency.

In the first aspect:

the number of requirements included in the release condition of the second character may be fewer than the number of requirements included in the release condition of the first character.

In the first aspect:

the performance of the special ability used by the other characters may correspond to the ability of the special ability serving as a release source.

A second aspect of the present disclosure includes an information processing method that is executed by at least either of a game terminal and a server that is capable of carrying out communication with the game terminal, the method including:

storing, in a storage unit, characters for which an acquisition condition is satisfied, as possessed characters, among a plurality of characters including a first character and a second character, each of the plurality of characters including the acquisition condition for acquiring that character, a special ability that is available in a prescribed game, and a release condition for releasing the special ability;

releasing the special ability of the first character in the case where the release condition of the first character is satisfied;

releasing the special ability of the second character in the case where the release condition of the second character is satisfied, the acquisition condition of the second character being different from the acquisition condition of the first character, and the release condition of the second character being different from the release condition of the first character; and in the case where the special ability of at least either of the first character and the second character is released, setting the released special ability such that the released special ability is available to other characters in the prescribed game.

In the second aspect:

the acquisition condition of the first character may include the consumption of an in-game currency; and the acquisition condition of the second character need not include the consumption of the in-game currency.

In the second aspect:

the number of requirements included in the release condition of the second character may be fewer than the number of requirements included in the release condition of the first character.

In the second aspect:

the performance of the special ability used by the other characters may correspond to the ability of the special ability serving as a release source.

A third aspect of the present disclosure includes an information processing system including a game terminal and a server that is capable of carrying out communication with the game terminal, wherein at least either of the game terminal and the server is configured to execute:

storing, in a storage unit, characters for which an acquisition condition is satisfied, as possessed characters, among a plurality of characters including a first character and a second character, each of the plurality of characters including the acquisition condition for acquiring that character, a special ability that is available in a prescribed game, and a release condition for releasing the special ability;

releasing the special ability of the first character in the case where the release condition of the first character is satisfied;

releasing the special ability of the second character in the case where the release condition of the second character is satisfied, the acquisition condition of the second character being different from the acquisition condition of the first character, and the release condition of the second character being different from the release condition of the first character; and in the case where the special ability of at least either of the first character and the second character is released, setting the released special ability such that the released special ability is available to other characters in the prescribed game.

In the third aspect:

the acquisition condition of the first character may include the consumption of an in-game currency; and the acquisition condition of the second character need not include the consumption of the in-game currency.

In the third aspect:

the number of requirements included in the release condition of the second character may be fewer than the number of requirements included in the release condition of the first character.

In the third aspect:

the performance of the special ability used by the other characters may correspond to the ability of the special ability serving as a release source.

What is claimed is:

1. A non-transitory computer readable medium storing a program causing a computer to perform a method comprising:

storing, in a storage unit disposed in a server, a plurality of game characters comprising a first game character and a second game character, wherein the first game character corresponds to a first acquisition condition for acquiring the first game character, a first special ability that is performable in a computer game, and a first release condition for releasing the first special ability, wherein the second game character corresponds to a second acquisition condition for acquiring the second game character, a second special ability that is performable in the computer game, and a second release condition for releasing the second special ability, and wherein the first special ability is associated with a first skill identifier (ID) that is stored in the server and the second special ability is associated with a second skill ID that is stored in the server;

displaying, using a display device in a player terminal, a party formation screen that identifies the plurality of game characters available for selection in a party within the computer game;

selecting, using an input unit in the player terminal and in response to displaying the party formation screen, the first game character and the second game character for the party within the computer game;

executing, by the player terminal in communication with the server over a communication network, the computer game using the party, wherein the computer game is executed with the first game character performing the first special ability and the second game character performing the second special ability;

releasing the first special ability of the first game character in response to the first release condition of the first game character being satisfied while executing the computer game;

releasing the second special ability of the second game character in response to the second release condition of the second game character being satisfied while executing the computer game, wherein the second acquisition condition of the second game character is different from the first acquisition condition of the first game character, and wherein the second release condition of the second game character is different from the first release condition of the first game character;

assigning, in response to the first special ability being released, the first special ability from the first game character to a third game character among the plurality of game characters, wherein the first special ability is assigned to the third game character by the server reassigning the first skill ID from the first game character to the third game character; and executing, by the player terminal in communication with the server over the communication network, the computer game with the third game character performing the first special ability.

2. The non-transitory computer readable medium according to claim 1, wherein:

the first acquisition condition of the first game character comprises consumption of an in-game currency; and the second acquisition condition of the second game character does not include consumption of the in-game currency.

3. The non-transitory computer readable medium according to claim 1, wherein a number of requirements included in the second release condition of the second game character is fewer than a number of requirements included in the first release condition of the first game character.

4. The non-transitory computer readable medium according to claim 2, wherein a number of requirements included in the second release condition of the second game character is fewer than a number of requirements included in the first release condition of the first game character.

5. The non-transitory computer readable medium according to claim 1, wherein performance of the first special ability used by the third game character corresponds to performance of the original special ability.

6. The non-transitory computer readable medium according to claim 2, wherein performance of the first special ability used by the third game character corresponds to performance of the original special ability.

7. The non-transitory computer readable medium according to claim 3, wherein performance of the first special ability used by the third game character corresponds to performance of the original special ability.

8. The non-transitory computer readable medium according to claim 4, wherein performance of the first special ability used by the third game character corresponds to performance of the original special ability.

9. An information processing method comprising:

storing, in a storage unit disposed in a server, a plurality of game characters comprising a first game character and a second game character, wherein the first game character corresponds to a first acquisition condition for acquiring the first game character, a first special ability that is performable in a computer game, and a first release condition for releasing the first special ability, wherein the second game character corresponds to a second acquisition condition for acquiring the second game character, a second special ability that is performable in the computer game, and a second release condition for releasing the second special ability, and wherein the first special ability is associated with a first skill identifier (ID) that is stored in the server and the second special ability is associated with a second skill ID that is stored in the server;

displaying, using a display device in a player terminal, a party formation screen that identifies the plurality of game characters available for selection in a party within the computer game;

selecting, using an input unit in the player terminal and in response to displaying the party formation screen, the first game character and the second game character for the party within the computer game;

executing, by the player terminal in communication with the server over a communication network, the computer game using the party, wherein the computer game is executed with the first game character performing the first special ability and the second game character performing the second special ability;

releasing the first special ability of the first game character in response to the first release condition of the first game character being satisfied while executing the computer game;

releasing the second special ability of the second game character in response to the second release condition of the second game character being satisfied while executing the computer game, wherein the second acquisition condition of the second game character is different from the first acquisition condition of the first game character, and wherein the second release condition of the second game character is different from the first release condition of the first game character;

assigning, in response to the first special ability being released, the first special ability from the first game character to a third game character among the plurality of game characters, wherein the first special ability is assigned to the third game character by the server reassigning the first skill ID from the first game character to the third game character; and executing, by the player terminal in communication with the server over the communication network, the computer game with the third game character performing the first special ability.

10. An information processing system comprising:

a player terminal comprising an input unit and a display device; and a server configured to communicate with the player terminal over a communication network, wherein the server is configured to perform a first method comprising:

storing, in a storage unit disposed in the server, a plurality of game characters comprising a first game character and a second game character, wherein the first game character corresponds to a first acquisition condition for acquiring the first game character, a first special ability that is performable in a computer game, and a first release condition for releasing the first special ability, wherein the second game character corresponds to a second acquisition condition for acquiring the second game character, a second special ability that is performable in the computer game, and a second release condition for releasing the second special ability, and wherein the first special ability is associated with a first skill identifier (ID) that is stored in the server and the second special ability is associated with a second skill ID that is stored in the server;

releasing the first special ability of the first game character in response to the first release condition of the first game character being satisfied while executing the computer game;

releasing the second special ability of the second game character in response to the second release condition of the second game character being satisfied while executing the computer game, wherein the second acquisition condition of the second game character is different from the first acquisition condition of the first game character, and wherein the second release condition of the second game character is different from the first release condition of the first game character;

assigning, in response to the first special ability being released, the first special ability from the first game character to a third game character among the plurality of game characters, wherein the first special ability is assigned to the third game character by the server reassigning the first skill ID from the first game character to the third game character;

wherein the player terminal is configured to perform a first method comprising:

displaying, using the display device, a party formation screen that identifies the plurality of game characters available for selection in a party within the computer game;

selecting, using the input unit and in response to displaying the party formation screen, the first game character and the second game character for the party within the computer game;

executing, in communication with the server over the communication network, the computer game using the party, wherein the computer game is executed with the first game character performing the first special ability and the second game character performing the second special ability;

executing, in communication with the server over the communication network, the computer game with the third game character performing the first special ability.

* * * * *